(12) United States Patent
Ben-Tzvi et al.

(10) Patent No.: US 11,305,420 B2
(45) Date of Patent: Apr. 19, 2022

(54) ARTICULATED MULTI-LINK ROBOTIC TAIL SYSTEMS AND METHODS

(71) Applicants: Pinhas Ben-Tzvi, Blacksburg, VA (US); Wael Saab, Blacksburg, VA (US); William Rone, Blacksburg, VA (US); Yujiong Liu, Blacksburg, VA (US)

(72) Inventors: Pinhas Ben-Tzvi, Blacksburg, VA (US); Wael Saab, Blacksburg, VA (US); William Rone, Blacksburg, VA (US); Yujiong Liu, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 16/428,732

(22) Filed: May 31, 2019

(65) Prior Publication Data

US 2019/0366533 A1 Dec. 5, 2019

Related U.S. Application Data

(60) Provisional application No. 62/678,309, filed on May 31, 2018, provisional application No. 62/678,318, filed on May 31, 2018.

(51) Int. Cl.
  *B25J 9/06* (2006.01)
  *B25J 9/04* (2006.01)
  (Continued)

(52) U.S. Cl.
  CPC ............... *B25J 9/06* (2013.01); *B25J 9/042* (2013.01); *B25J 9/08* (2013.01); *B25J 17/0241* (2013.01)

(58) Field of Classification Search
  CPC . B25J 17/0241; B25J 9/042; B25J 9/06; B25J 9/08; B25J 9/1045; B25J 9/065;
  (Continued)

(56) References Cited

U.S. PATENT DOCUMENTS

| | | | |
|---|---|---|---|
| 2006/0199999 A1* | 9/2006 | Ikeda | A61B 1/00149 600/141 |
| 2014/0035306 A1* | 2/2014 | Garcia | B25J 15/0009 294/213 |

(Continued)

FOREIGN PATENT DOCUMENTS

CN 105881525 A * 8/2016 ............... B25J 9/06

OTHER PUBLICATIONS

Liu, Yujiong et al., "A Cable Length Invariant Robotic Tail Using a Circular Shape Universal Joint Mechanism" ASME Journal of Mechanisms and Robotics vol. 11(5); 2019.
(Continued)

*Primary Examiner* — Vinh Luong
(74) *Attorney, Agent, or Firm* — Thomas | Horstemeyer, LLP.

(57) ABSTRACT

An articulated multi-link robotic tail (MLRT) system is provided comprising a rigid housing, an actuation unit coupled to the rigid housing, and an MLRT having a proximal end that is coupled to the rigid housing and a distal end opposite the proximal end. The MLRT comprises N segments, where N is a positive integer that is greater than or equal to one. Each segment comprises i links, where i is a positive integer that is greater than or equal to two. Each link is mechanically coupled to an actuator of the actuation unit and capable of being actuated by the actuator to which it is mechanically coupled to adjust a pitch, yaw and roll of the MLRT. The articulated MLRT system is well suited for (Continued)

being integrated with a mobile robot to assist in stabilizing and maneuvering the mobile robot.

18 Claims, 22 Drawing Sheets

(51) Int. Cl.
*B25J 17/02* (2006.01)
*B25J 9/08* (2006.01)

(58) Field of Classification Search
CPC ...... B25J 17/0208; B25J 18/00; B25J 9/0021; B25J 9/1005; B25J 9/102; B25J 9/109; B25J 9/126; B25J 19/0091; B25J 9/1065; B25J 9/1664; B25J 17/00; F16D 13/00; F16D 28/00; F16H 15/38; G08C 17/02; Y10T 74/20317; B33Y 80/00; B25D 57/032
See application file for complete search history.

(56) References Cited

U.S. PATENT DOCUMENTS

| | | | |
|---|---|---|---|
| 2016/0052130 A1* | 2/2016 | Ekas | B25J 9/1045 74/490.04 |
| 2017/0100197 A1* | 4/2017 | Zubiate | A61B 17/3417 |
| 2017/0266806 A1* | 9/2017 | Radin | B25J 9/102 |
| 2019/0091857 A1* | 3/2019 | Ben-Tzvi | B25J 9/1664 |
| 2020/0039064 A1* | 2/2020 | McKinley | B25J 9/0087 |
| 2020/0047332 A1* | 2/2020 | Salisbury, Jr. | B25J 9/104 |
| 2020/0307750 A1* | 10/2020 | Jing | B63G 8/08 |

OTHER PUBLICATIONS

Ben-Tzvi, Pinhas et al., "An Articulated Closed Kinematic Chain Planar Robotic Leg for High-Speed Locomotion" ASME Journal of Mechanisms and Robotics; vol. 12(4); 2020.

Rone, William S. et al. "Controller Design, Analysis, and Experimental Validation of a Robotic Serpentine Tail to Maneuver and Stabilize a Quadrupedal Robot" Journal of Dynamic Systems, Measurements, and Control, Aug. 2019, vol. 141 081002-1-081002-9.

Kamidi, Vinay R. et al. "Design and Analysis of a Novel Planar Robotic Leg for High-Speed Locomotion" 2017 IEEE/RSJ Int'l Conf. on Intelligent Robots and Systems (IROS) Sept. 24-28, 2017.

'Saab, Wael et al., ""Design and Analysis of a Robotic Modular Leg Mechanism."" Proceedings of the ASME 2016 International Design Engineering Technicaly Conferences & Computers and Information in Engineering Conference, Aug. 21-24, 2016, North Carolina. 1-8.TH.

Saab, Wael et al., "Design and Integration of a Novel Spatial Articulated Robotic Tail" IEEE/ASME Transactions on Mechatronics, vol. 24, No. 2, Apr. 2019.

Liu, Yujiong et al., "Design, Analysis, and Optimization of a New Two-DOF Articulated Multi-Link Robotic Tail" Proceedings of the ASME 2019 International Design Engineering Technical Conferences and Computers and Information in Engineering Conference DETC/CIE Aug. 18-21, 2019, 2019, Anaheim, CA, USA.

Rone, William S. et al., "Design, Modeling, and Integration of a Flexible Universal Spatial Robotic Tail" Journal of Mechanisms and Robotics Aug. 2018, vol. 10, 041001-1-041001-14.

Rone, William S. et al., "Design, Modeling, and Optimization of the Universal-Spatial Robotic Tail" Proceedings of the ASME 2017 International Mechanical Engineering Congress and Exposition, Nov. 3-9, 2017.

Rone, William S. et al., "Maneuvering and stabilization control of a bipedal robot with a universal-spatial robotic tail" Bioinspir. Biomim. 14 (2019) 016014.

Saab, Wael et al., "Modeling and Control of an Articulated Tail for Maneuvering a Reduced Degree of Freedom Legged Robot" 2018 IEEE/RSJ International Conference on Intelligent Robots and Systems (IROS) Oct. 1-5, 2018.

Saab, Wael et al., "Robotic Modular Leg: Design, Analysis, and Experimentation" Journal of Mechanisms and Robotics, Apr. 2017, vol. 9, pp. 024501-1-024501-6.

* cited by examiner

ARTICULATED MULTI-LINK ROBOTIC TAIL SYSTEMS AND METHODS

CROSS-REFERENCE TO RELATED APPLICATION

This application claims priority to and the benefit of the filing dates of copending U.S. provisional applications entitled, "ROLL-REVOLUTE-REVOLUTE ROBOTIC TAIL (R3RT) MECHANISM FOR MANEUVERING AND STABILIZATION OF MOBILE ROBOTS," having Ser. No. 62/678,309, filed on May 31, 2018, and "UNIVERSAL-SPATIAL ROBOTIC TAIL MECHANISM," having Ser. No. 62/678,318, filed on May 31, 2018, which are hereby entirely incorporated herein by reference.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of Grant Nos. 1557312 and 1906727 awarded by the National Science Foundation of the U.S.

TECHNICAL FIELD

The present invention is generally related to robotic tails and, more particularly, to articulated, bio-inspired multi-link robotic tails. The articulated bio-inspired multi-link robotic tails are well suited for being integrated with mobile robots to assist in stabilizing and maneuvering the mobile robots.

BACKGROUND

In nature, animals use tails for a variety of tasks including stabilization, maneuvering, propulsion, and manipulation. Attracted by these amazing functionalities, researchers recently devoted significant effort towards investigating the dynamical effects of tails on mobile platforms both theoretically and practically. Focusing on its functionality as a manipulator, a tail is essentially a flexible onboard serial manipulator the likes of which have been investigated and widely used for decades. Based on the system complexity, existing robotic tails range in complexity from the simplest and most commonly used pendulum tails to the most complex elastic continuum tails.

As the first step, most researchers abstract the tail animal as a single-link pendulum. This approach brings obvious benefits: by modeling and implementing the tail as one rigid body, the analysis and prototyping can be simplified significantly. Research has revealed that the tail has important effects on animal locomotion, especially for highly agile transient behaviors, such as accelerating, maneuvering, and stabilization. However, the single-link model has a fundamental drawback in that the animals in nature evolved multi-link structure tails. This makes the single-link approach unable to explain the complicated tail behaviors exhibited in nature.

Multi-link tails have been proposed for both modeling and implementation purposes. Theoretical research by inventors of the present application shows that an articulated multi-link robotic tail structure has the benefit of generating a higher inertial loading and volumetric center of mass workspace. See "Dynamic Modeling and Simulation of a Yaw-Angle Quadruped Maneuvering With a Planar Robotic Tail," by Rone, W. and Ben-Tzvi, P., 2016, *Journal of Dynamic Systems, Measurement, and Control*, 138(8), p.084502. A need exists for a multi-link robotic tail capable of achieving these and other benefits and that can be constructed using a relatively small number of actuators and relatively simple controls while also achieving a highly robust structure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
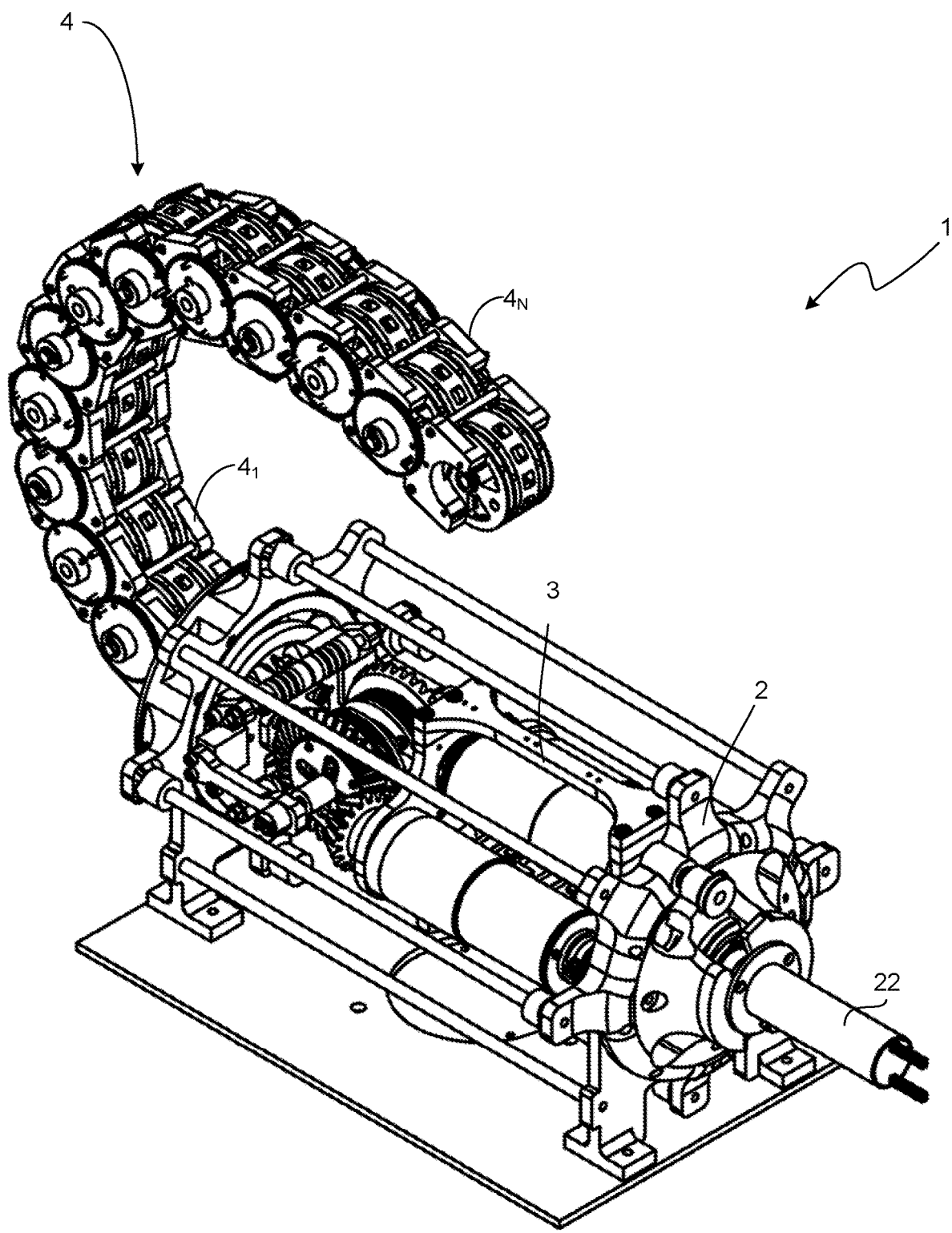
FIG. 1 is a perspective view of the articulated multi-link robotic tail system in accordance with a representative embodiment.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses, devices and methods may be omitted so as not to obscure the description of the exemplary or representative embodiments. Such methods, apparatuses and devices are clearly within the scope of the present teachings, as will be understood by those of skill in the art.

It should also be understood that the word "example," as used herein, is intended to be non-exclusionary and non-limiting in nature. More particularly, the words "exemplary" or "representative," as used herein, indicate one among several examples, and it must be understood that no undue emphasis or preference is being directed to the particular example being described.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as, for example, "over," "above," "below," "top," "bottom," "upper" and "lower" may be used to describe the various elements' relationships to one another, as illustrated in the accompanying drawings. Such relative terms are intended to encompass different orientations of the device and/or elements in addition to the orientation depicted in the drawings. For example, if the device were inverted with respect to the view in the drawings, an element described as "above" another element, for example, would now be below that element.

Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than electrical connectors (e.g., wires, bonding materials, etc.).

Representative embodiments will now be described with reference to the figures, in which like reference numerals represent like components, elements or features. It should be noted that features, elements or components in the figures are not intended to be drawn to scale, emphasis being placed instead on demonstrating inventive principles and concepts.

In accordance with a first representative embodiment of the multi-link robotic tail system, the articulated multi-link robotic tail is a roll-revolute-revolute robotic tail (R3RT), as will now be described with reference to FIGS. 1-10. In accordance with this representative embodiment, the RTR3 is a spatial tail structure capable of generating spatial loading at its base. The R3RT is being used in ongoing research studying articulated robotic tails capable of augmenting a legged robot's ability for agile and robust terrain traversal in unstructured environments. Beyond application as a tail, the R3RT design may also be used in other applications, including, but not limited to, a snake-like mobile robot, fish- or tentacle-like aquatic propulsion, energy harvesting by an articulated structure and satellite reorientation.

In accordance with a representative embodiment, the R3RT design was chosen to meet three design goals. First, the R3RT design was chosen to be spatial and multifunctional, capable of affecting the mobile robot dynamically and quasi-statically. Quasi-static loading uses the tail to modify the system's center-of-mass (COM) position. Therefore, the R3RT design was chosen to have a large workspace to maximize COM adjustments. Dynamic loading uses rapid tail motions to generate high-magnitude inertial loading to affect the system dynamics. A spatial R3RT design provides yaw, pitch, and roll loading. In accordance with this embodiment, the R3RT is capable of generating significant moments about all directions.

Second, the R3RT design was chosen to be articulated and to be capable of multiple mode shapes. Articulation enhances loading compared to that of a pendulum-like structure. In particular, serpentine articulation was chosen for the R3RT design, modeling and sensing. Extrinsic actuation transmitted by cabling was chosen to reduce the minimum tail size, inertia, and actuator loads. Fixed motion coupling was chosen to constrain the links' relative motion within tail segments. Cables routed along contoured cylindrical links were chosen to decouple the tail segments' actuation and ensure equal and opposite antagonistic cable displacement.

Third, the R3RT design was chosen to operate in a cantilevered mode. Several macroscale-articulated robots are designed for vertical operation without consideration for cantilevered mounting. The R3RT was designed to be capable of remaining fully extended with minimal to no actuation.

Based on these three design goals, the chosen R3RT design provides the following: a dexterous tail structure capable of foaming two mechanically decoupled tail mode shapes, enhanced COM and end-effector workspaces due to having two independent tail segments, enhanced articulated tail inertial loading capabilities compared to pendulum-like tails, and spatial tail curvatures enabled via an infinite roll rotation that can operate as both a symmetrical and an asymmetrical inertial adjustment mechanism.

Figure 2:
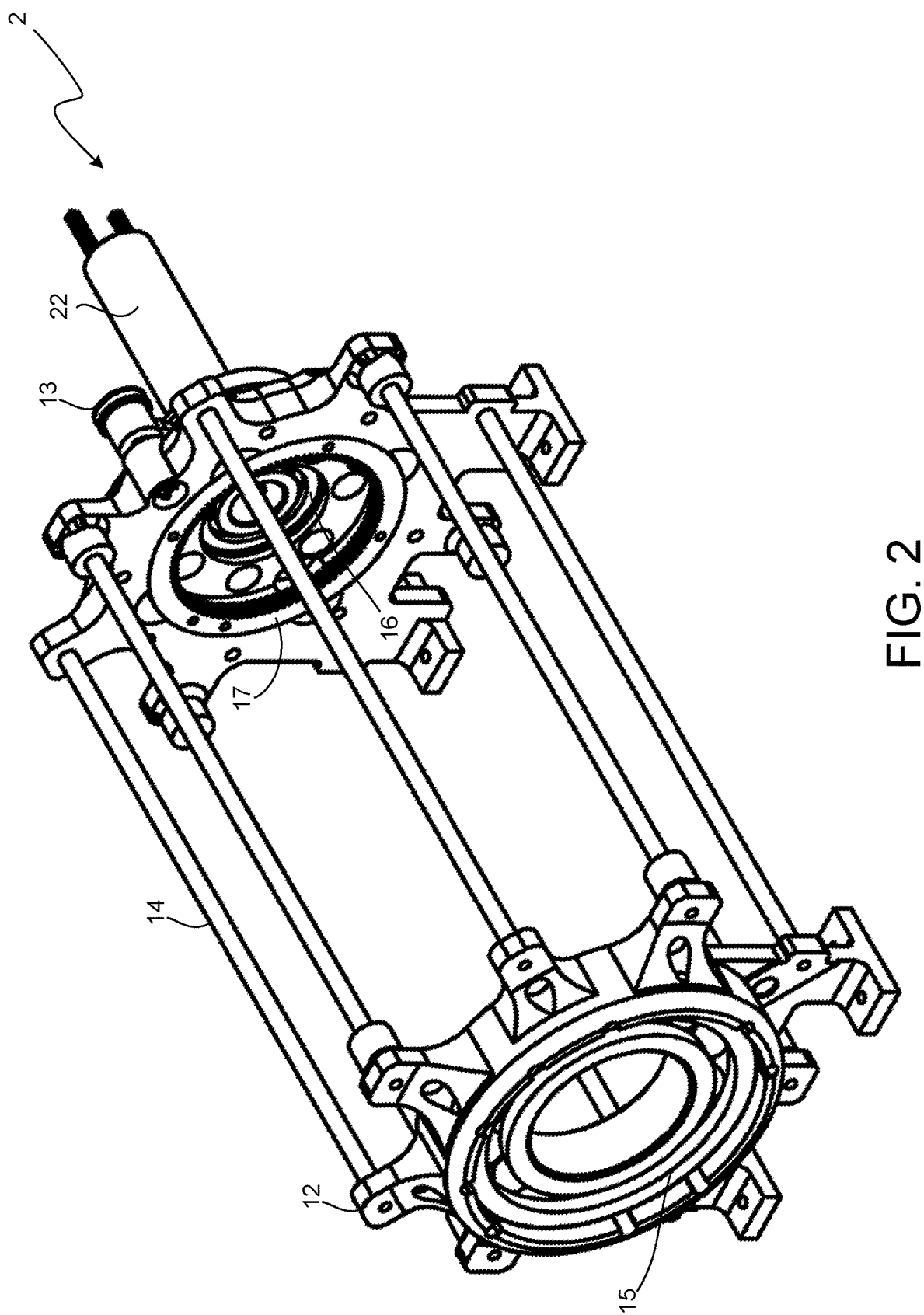
FIG. 2 is a perspective view of the rigid housing of the multi-link robotic tail system shown in FIG. 1 in accordance with a representative embodiment.
Figure 3:
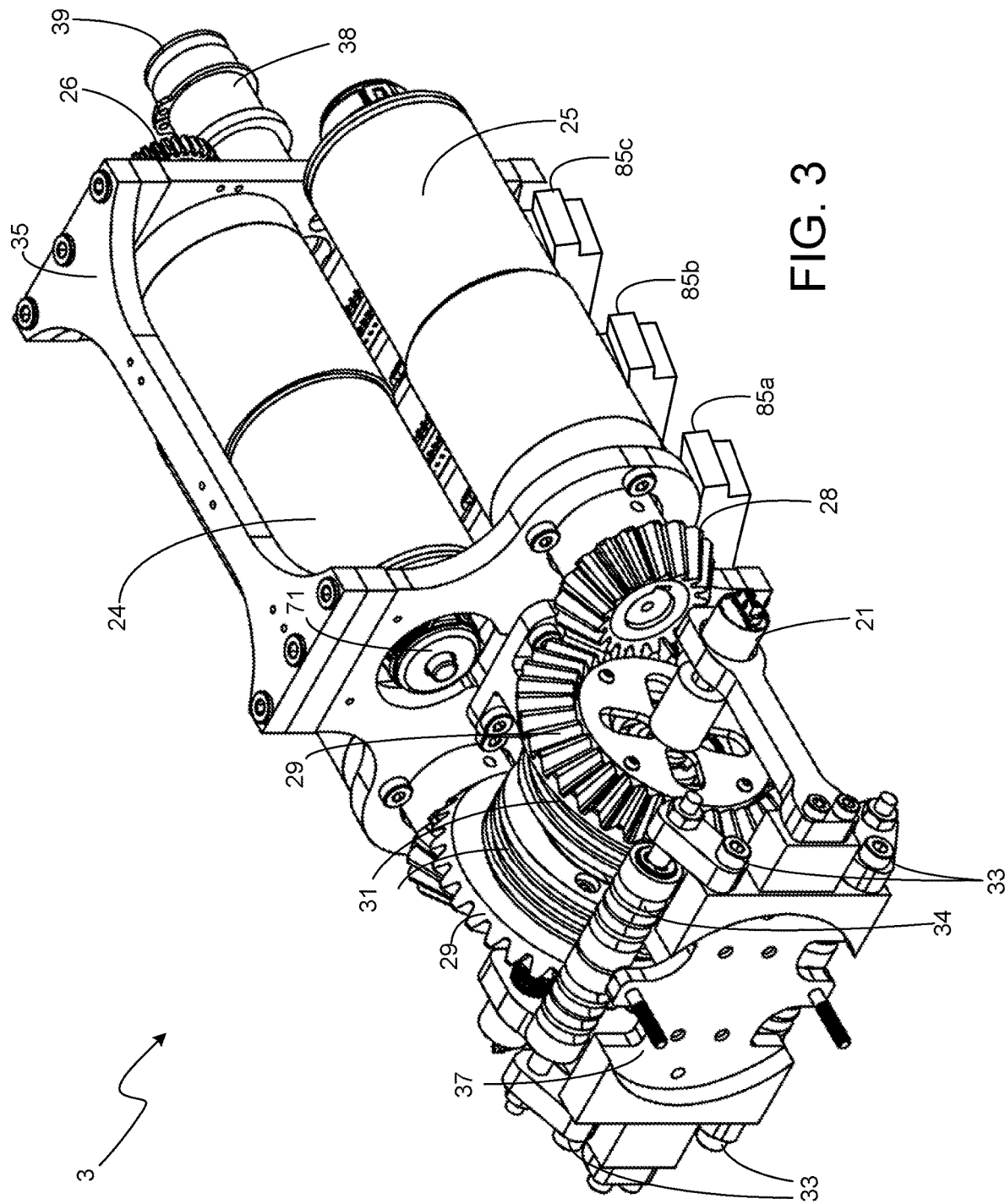
FIG. 3 is a perspective view of the actuation unit of the multi-link robotic tail system shown in FIG. 1 in accordance with a representative embodiment.

FIG. 1 is a perspective view of the R3RT system 1 in accordance with a representative embodiment. The R3RT system 1 comprises a rigid housing 2, a tail actuation unit 3, and a tail 4 comprising N tail segments $4_1$-$4_N$, where N is a positive integer that is greater than or equal to one. Each of the tail segments $4_1$-$4_N$ comprises i links, where i is a positive integer that is greater than or equal to two. FIG. 2 is a perspective view of the rigid housing 2, which comprises first and second frames 12 and 13, respectively, coupled together with steel rods 14 to provide a lightweight R3RT support structure. First and second bearings 15 and 16, respectively, set in the rigid housing 2 provide the R3RT with roll-degree-of-freedom (DOF). An internal gear 17 is mounted on the rigid housing 2 to facilitate roll-DOF actuation. FIG. 3 is a perspective view of the actuation unit 3. An absolute encoder 21 of the actuation unit 3 is mounted on the rigid housing 2 and coupled to the actuation unit 3 via a timing belt. A high-current miniature slip ring 22 (FIG. 2) transmits control signals and motor current to the actuation unit 3. This allows the R3RT system 1 to continuously rotate; when the tail segment's COM aligns with the roll axis, the R3RT system 1 is a reaction wheel. This is an advantage over prior tail designs with more constrained workspaces.

The actuation unit 3 (FIG. 3) comprises three gear motors, namely, a roll-DOF motor 24 and first and second segment motors 25. The roll-DOF motor 24 is one example of a roll-DOF actuator, and the first and second segment motors 25 are examples of segment actuators. The roll-DOF motor 24 provides roll-DOF and the first and second segment motors 25 provide DOFs for the tail segments $4_1$-$4_N$. The roll-DOF motor 24 attaches to a spur gear 26 meshed with the internal gear 17 of the rigid housing 2. The first and second segment motors 25 couple with first and second cable pulleys 31, which can include two-channel pulleys, respectively, through a pinion/bevel gear reduction comprising a respective pinion gear 28 and a respective bevel gear 29 of a bevel gear transmission system. The cable pulleys 31 connect to respective antagonistic cable pairs that actuate the respective tail segment $4_1$-$4_N$ driven by the respective segment motor 25.

An inbuilt tensioning system comprises four adjustable tensioning mechanisms 33 with passive rollers 34 for individually tensioning the two antagonistic cables per actuated tail segment $4_1$-$4_N$ to ensure a straight home configuration and minimize backlash. The inbuilt tensioning system provides a quick and easy method for tensioning the cables to ensure a straight home configuration, and minimize backlash. The tensioning system can tension up to four cables coming from the tail segments $4_1$-$4_N$. A segment plate 37 provides a grooved diameter and mounting holes that are used to rigidly connect base links of the tail segments $4_1$-$4_N$ to the actuation unit 3.

A skeleton-like metallic frame 35 houses the three motors 24-25, electronics, sensors, and the bevel gear transmission system. The actuation unit 3 is supported by two bearings within the rigid housing 2. The roll-DOF motor 24 actuates roll motion by meshing its spur gear 26 with the internal gear 17 located in the second frame 13 (FIG. 2) while the first and second segment motors 25 actuate tail curvature motion via the bevel gear transmission system. The pinion gears 28 are attached to the respective motor output shafts of the respective segment motors 2. Each bevel gear 29 is rigidly attached to one of the two-channel pulleys 31 that clamps onto cables, which are terminated at the tail segments $4_1$-$4_N$. First and second absolute encoders 37 provide sensory feedback of the measured angular rotation of the first and second two-channel pulleys 31, respectively.

FIG. 1 shows the tail segment configuration in accordance with a representative embodiment in which the tail 4 has only two tail segments $4_1$ and $4_2$, with each segment having six links such that the tail 4 has a total of twelve links. The links are connected serially to create a two-segment robotic structure capable of planar "bending," as will be described below in detail with reference to FIGS. 5-7.

Figure 4B:
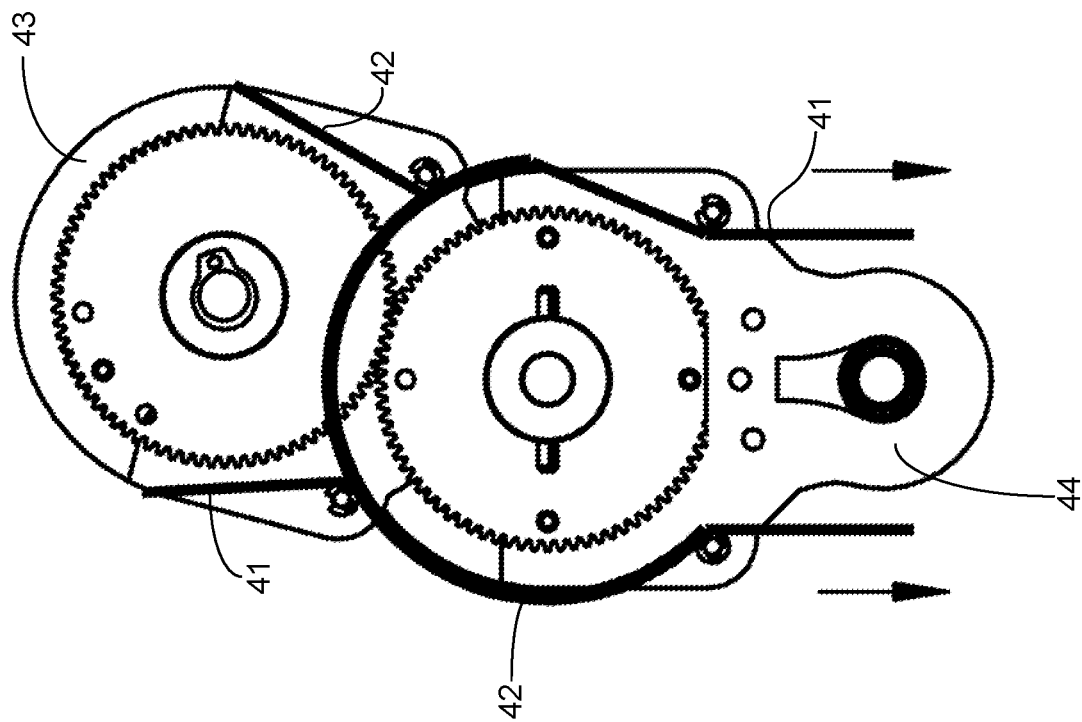
FIGS. 4A and 4B depict a nested cable routing configuration that is used for routing the cables through the links comprising the tail segments of the multi-link robotic tail system shown in FIG. 1 in accordance with a representative embodiment.
Figure 4A:
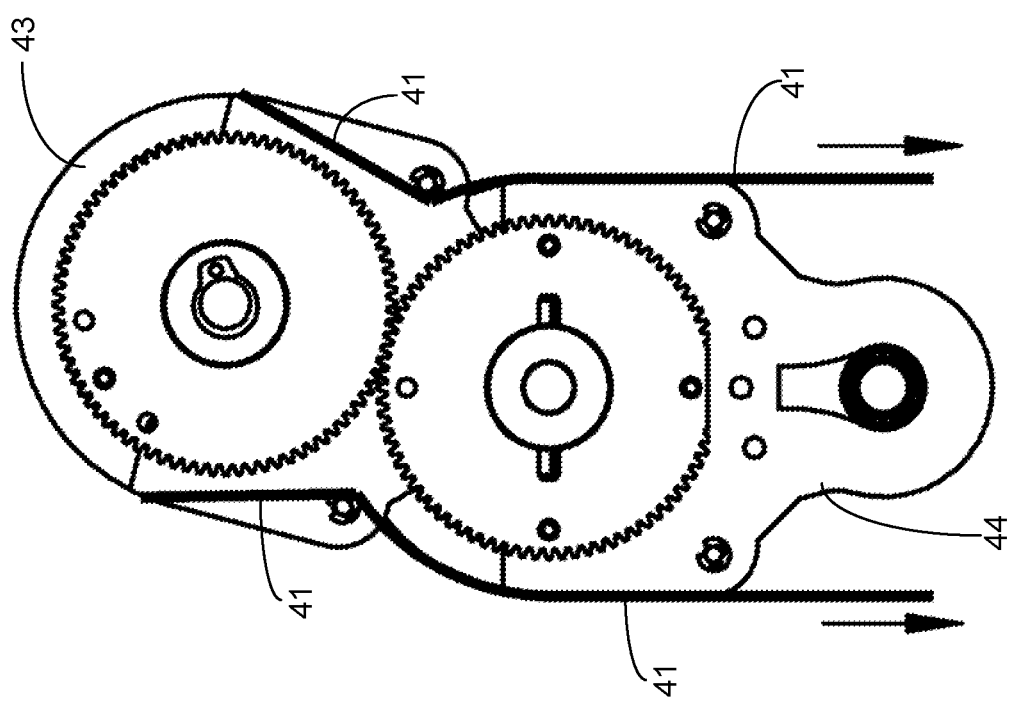

FIGS. 4A and 4B depict a nested cable routing configuration that is used for routing the cables 41 and 42 through the links comprising the tail segments $4_1$-$4_N$. In FIGS. 4a and 4B two interconnecting links 43 and 44 of the first segment 41 are shown. For ease of discussion, it is assumed herein that N=2, i.e., that the tail 4 has only first and second tail segments $4_1$ and $4_2$. In accordance with this representative embodiment, the cables 41 and 42 are routed using a parallel routing configuration and an S-shaped routing configuration, respectively. The cables 41 and 42 are routed along nested cylindrical surfaces of the disks of the links 43 and 44 to ensure equal cable extension/retraction of the antagonistic cabling during motion. FIG. 4A shows the resulting sub segment cable extension/retraction using the parallel cable routing method of cable 41. The nested cylinder cable routing approach allows use of a single pulley to simultaneously control the extension/retraction of an antagonistic cable pair without the need for an additional mechanism to account for the variance in extension/retraction during tail motion. The decoupled actuation of the first and second tail segments results from the cable routing path of the second segment actuation through the first segment. The S-shaped winding of cable 42 (FIG. 4B) enables the control of curvature of the second segment that is not affected by bending of the first segment. A null-space is created by routing the cable in an S-shape through pairs of the disks of the first segment, as shown in FIG. 4B. As the first segment bends, the S-shaped cable routing ensures that for each pair of disks, the cable path length increases and decreases by the same amount, resulting in zero net cable displacement in the second segment regardless of the configuration of the first segment.

Figures 5A, 5B:
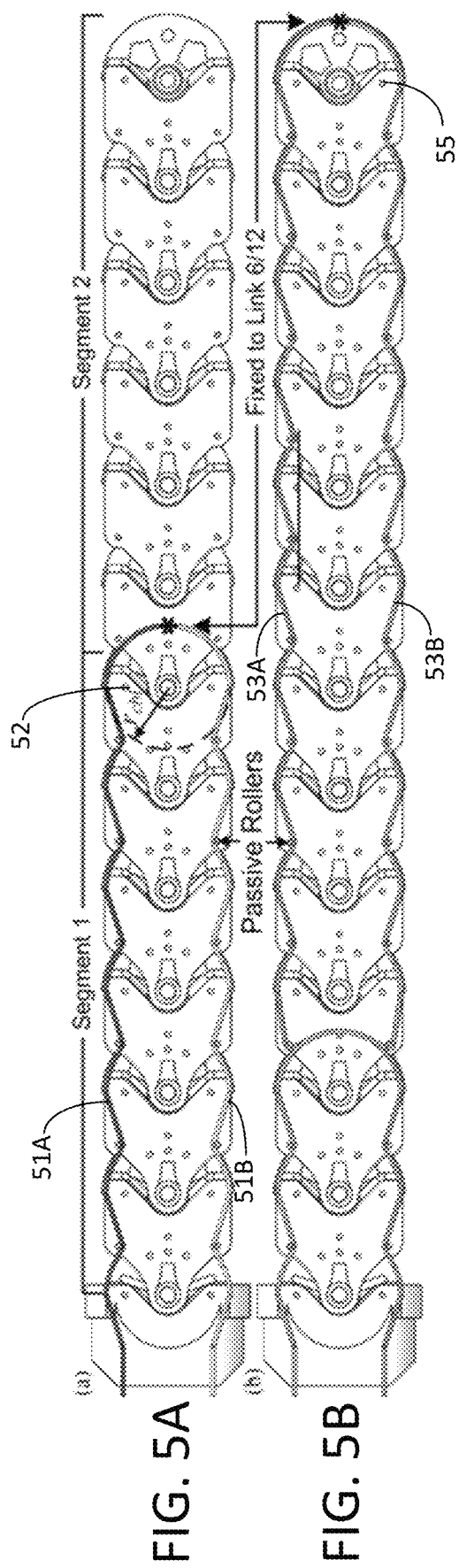
FIG. 5A shows the cable paths for a first segment of the multi-link robotic tail system shown in FIG. 1 in accordance with a representative embodiment.
FIG. 5B shows the cable paths for a second segment of the multi-link robotic tail system shown in FIG. 1 in accordance with a representative embodiment.

As indicated above, the R3RT link design ensures equal antagonistic cable displacements by routing cables along nested cylindrical surfaces of the links. FIG. 5A shows the cable paths for Segment 1, in which the cable pairs 51A and 51B route along six cylindrical surfaces before terminating at the sixth link 52. Segment 1 antagonistic cable displacements are defined by the linear relationship $6r_{cb1}\theta_i$, where $r_{cb1}$ is the cylinder contour radius and $\theta_i$ is the relative link rotation. Since joint motions increase/decrease the cable path length by the same amount on opposite sides, a single pulley can control both cables.

The R3RT cable routing also mechanically decouples the Segment 1 and 2 actuation. FIG. 5B shows the cable paths 53A and 53B for Segment 2 and terminating at the twelfth link 55. Within Segment 2, the cable routing is similar to the Segment 1 cables in the first through sixth links (FIG. 5A). However, through first through sixth links of segment 1, segment 2 cabling routes along an S-path and crosses the tail between the second and third links. With this S-path routing, the cable path on Links 0-2 and Links 3-5 will extend and shorten the cable path by equal amounts, creating a null space for the Segment 2 cable displacements with respect to Segment 1's motion. However, this assumes that the joint angles along the segment are equal.

Figure 6:
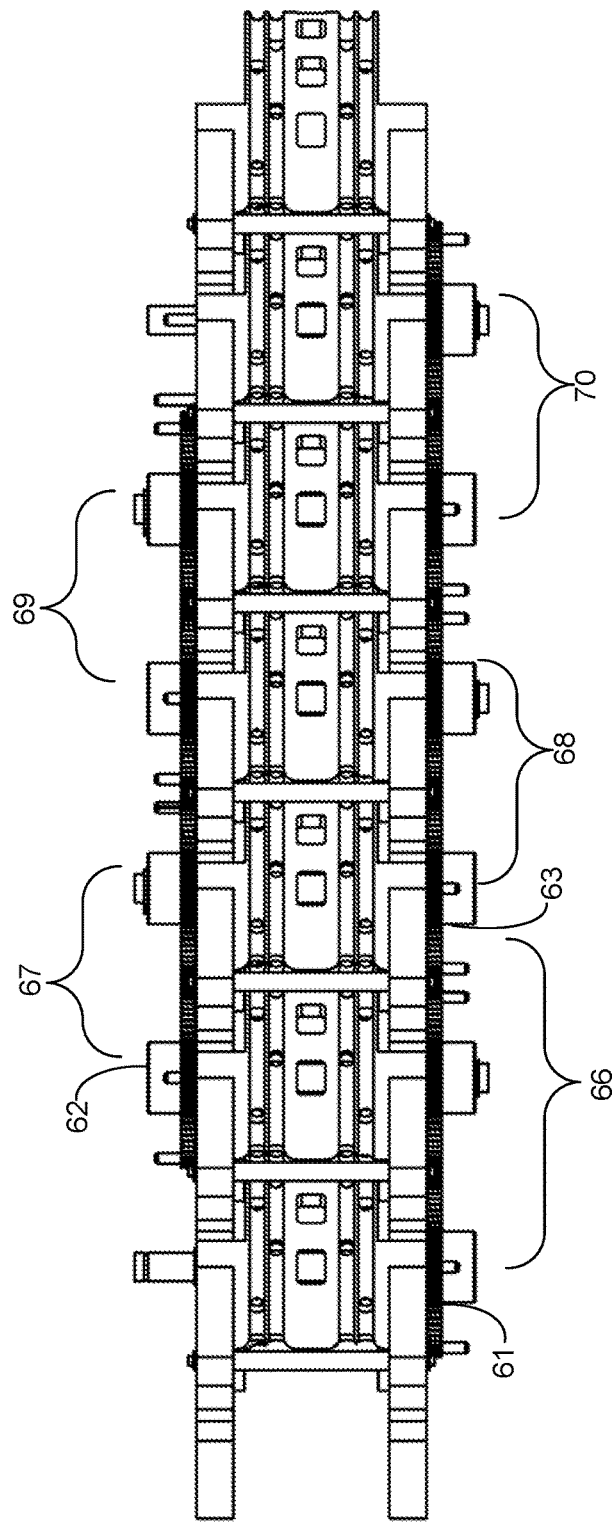
FIG. 6 shows a top view of a six of the links of the multi-link robotic tail system shown in FIG. 1 in accordance with a representative embodiment.
Figure 7:
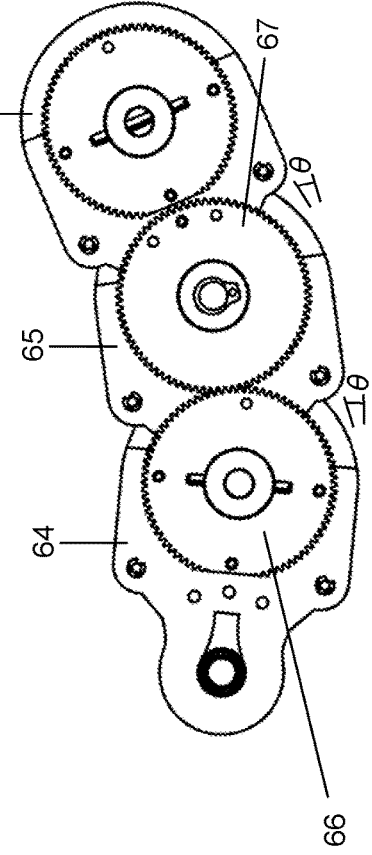
FIG. 7 shows a side view of three of the interconnected links of the multi-link robotic tail system shown in FIG. 1 in accordance with a representative embodiment.

FIG. 6 shows a top view of a six of the links of the tail 4 interconnected by gears disposed on the links. FIG. 7 shows a side view of three of the interconnected links. To ensure equal joint angles in each segment, the R3RT in accordance with this embodiment utilizes five gear pairs mounted along each segment. Each gear pair 66-70 is mounted on two links with a single link separating them, as shown in FIG. 6. For example, in the first gear pair 66, the first gear (A) 61 meshes with the second gear (C) 63 with an intermediate link (B) 62 in between. The gears in each pair also have equal pitch diameters. For the gear pair associated with Links i−1 (64), i, and i+1 (66), shown in FIG. 7, gears 66 and 67 are rigidly attached to Links i−1 (64) and i+1 (66), with Link i (65) in between. If Link i−1 (64) is held fixed, Link I (65) will rotate by angle θ relative to Link i−1 (64), and Link i+1 (66) will rotate by θ relative to Link I (65). This is done for the five sequential triplets of Links 0-6 (Segment 1) and Links 7-12 (Segment 2) to ensure equal joint angles along each segment.

Although gears are used in the R3RT design to implement the joint coupling, other mechanisms of rigidly coupling the links' rotations using linkages may be used, as will be described below in more detail.

In accordance with an embodiment, two types of joint-space sensing are integrated into the R3RT system 1: angular position (roll-DOF and cable pulleys) and motor speed. The absolute encoders 21, which may be, for example, US Digital MA3 absolute encoders, measure the angular position of the hollow shaft 38 (FIG. 3) or of the two-channel pulleys 31 (FIG. 3). For ease of illustration, the roll-DOF absolute encoder 21 that couples with a hollow shaft 38 (FIG. 3) is not shown in FIG. 3. The roll-DOF encoder 21 that connects to the hollow shaft 38 mounts on the rigid housing 2 (FIG. 2) and couples to the actuation unit 3 using a timing belt. The segment-DOF encoders 21 connect to the two-channel pulleys 31 through the bevel gear 29 (FIG. 3). Each motor's angular velocity is estimated by its driver using an incremental encoder 71 (FIG. 3) mounted on its rear shaft. The actuation unit 3 further includes an encoder groove 39 adjacent to the hollow shaft 38.

To enable high-speed motions of the tail 4, the motors 24 and 25 (FIG. 3) may be, for example, three Maxon 100 W brushless direct current (dc) motors operating in closed-loop position control. Gear reductions were selected to meet the desired cable speeds and force estimates for a range of possible robotic tails.

Figure 8:
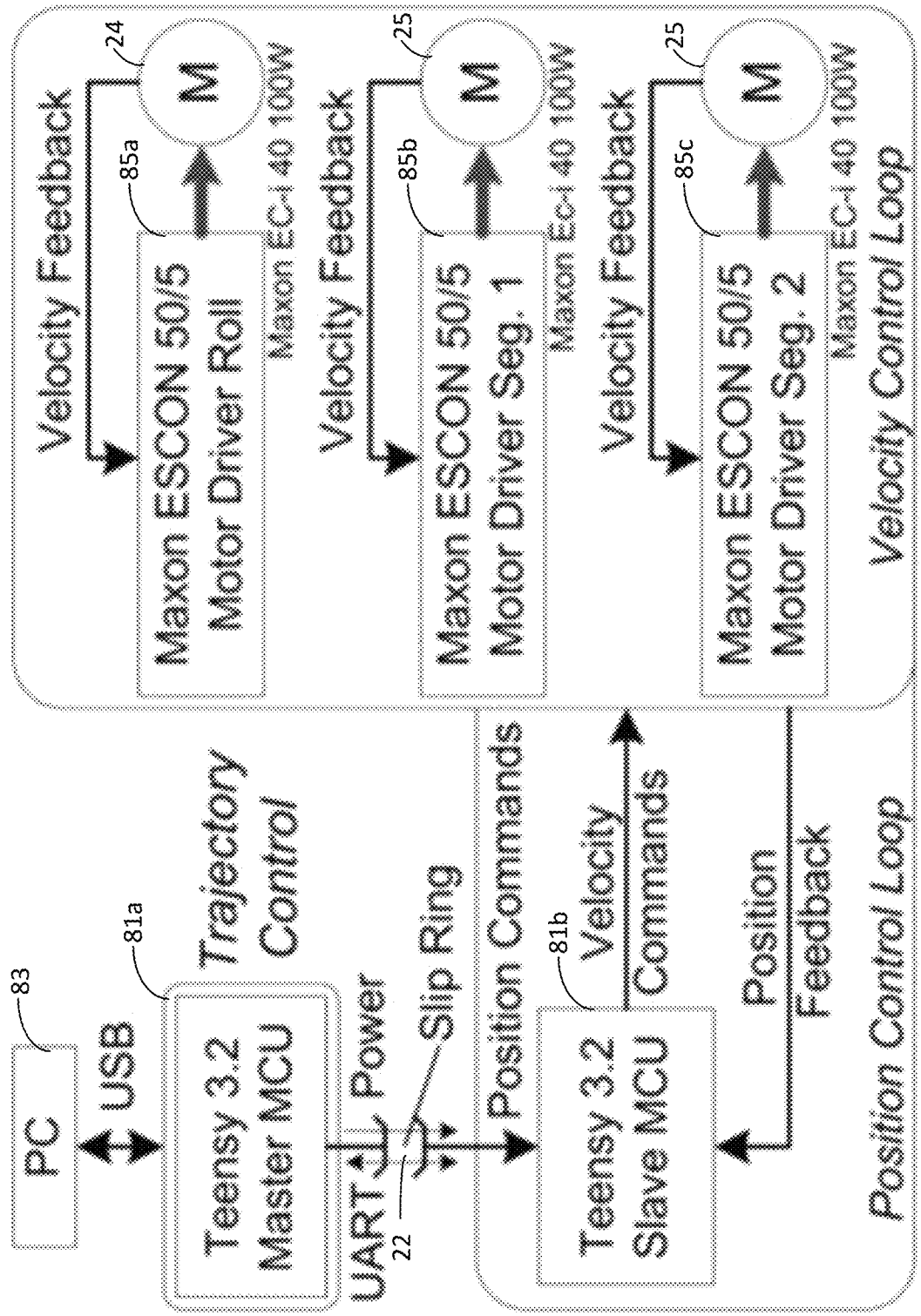
FIG. 8 shows a block diagram of the electrical circuitry of the of the multi-link robotic tail system shown in FIG. 1 in accordance with a representative embodiment.

FIG. 8 shows a block diagram of the electrical control circuitry of the R3RT system I in accordance with a representative embodiment. The circuit configuration shown in FIG. 8 was used for the prototype of the R3RT system 1, but many other configurations may be used, as will be understood by those of skill in the art in view of the description provided herein. There circuit configuration shown in FIG. 8 is merely one example of a suitable circuit configuration for the R3RT system 1.

In accordance with this representative embodiment, the controller of the system 1 comprises two Teensy 3.2 ARM microcontroller units (MCUs) 81a and 81b that control the system 1 in a master-slave configuration In accordance with this representative embodiment, the MCUs 81a and 81b communicate with one another via a Universal Asynchronous Receiver/Transmitter (UART) link through the slip ring 22 (FIG. 2). The master MCU 81a mounts to the rigid housing 2 and interconnects the user PC 83 and the slave MCU 81b. It should be noted That the PC 83 is optional, The master MCU 81a receives the user's desired joint trajectories, interpolates them into position set points, and sends them to the slave MCU 81b. The master MCU 81a also exercises software control over motor power through a high side metal oxide semiconductor field effect transistor (MOSFET).

The slave MCU 81b preferably is mounted within the actuation unit 3 to ensure robust connections with the sensors and motor drivers. In accordance with an embodiment, the slave MCU 81b comprises a proportional-derivative controller for closed-loop motor position control that generates velocity set points and then sends them to each motor driver 85a-85c. The drivers 85a-85c may be, for example, Maxon ESCON 50/5 drivers, each of which comprises a closed-loop proportional-integral velocity controller for controlling its respective motor 24-25. The position controller may be tuned for near-critical operation on the basis of empirical analysis. In accordance with an embodiment, the position control loop operates at a control frequency of 450 Hz, which is sufficient for accurate tracking during fast tail trajectories.

Figure 9:
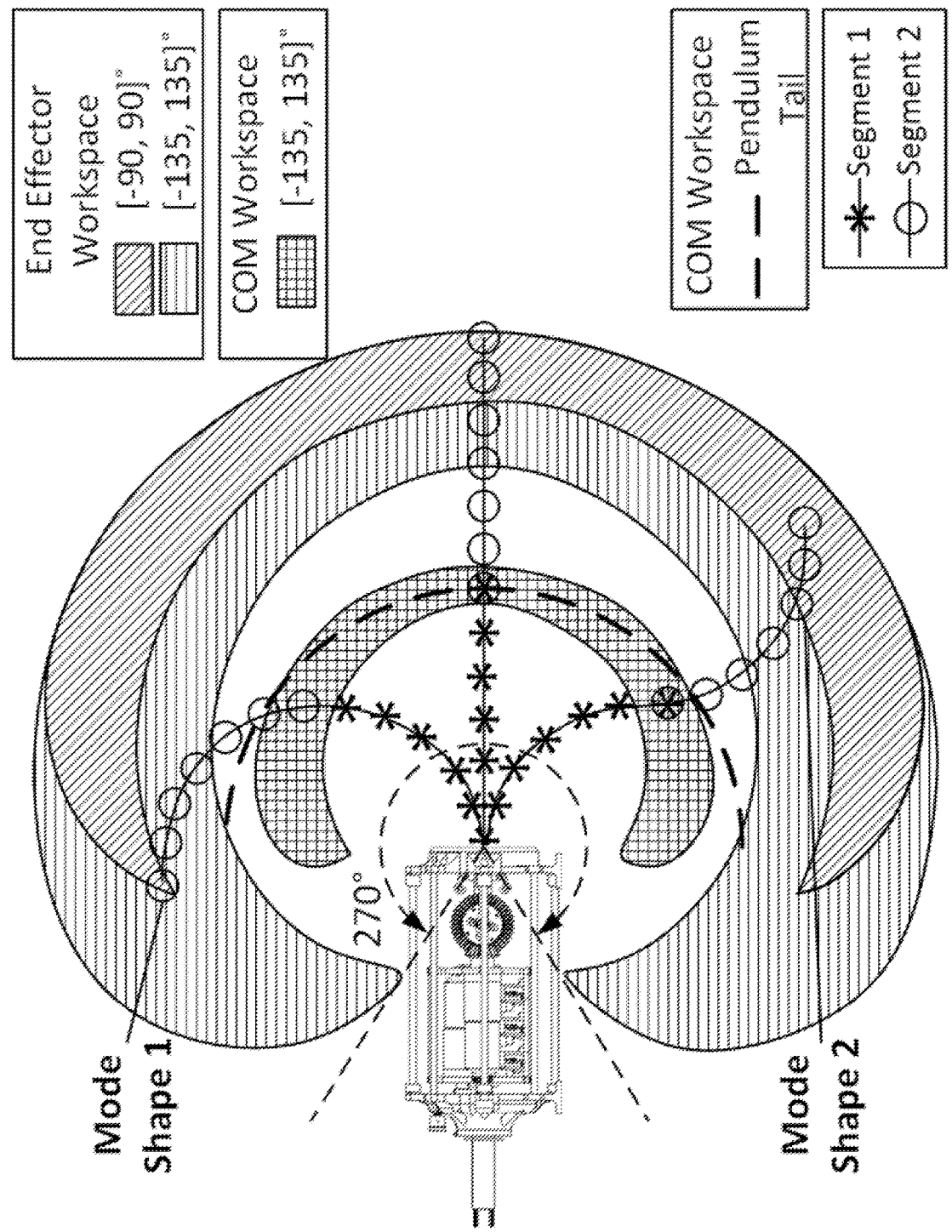
FIG. 9 shows the two mode shapes and the workspace of the multi-link robotic tail system shown in FIG. 1 in accordance with a representative embodiment.

The R3RT system 1 can form multi-curvature spatial tail configurations for enhanced spatial loading and workspace. FIG. 9 shows the two mode shapes of the R3RT system 1 in accordance with an embodiment, Mode shape 1 is a C-shape with the segments bent in parallel. Mode shape 2 is an S-shape with the segments bent in opposition. The end effector and COM workspaces are the loci of positions that the Link 12 tip and COM can reach, respectively. The end effector workspace may be computed using the forward kinematics of the R3RT system 1 based on the geometric parameters extracted from the R3RT computer-aided design (CAD) and the prototype. FIG. 9 shows the R3RT's planar workspaces (end effector and COM) with the roll angle fixed at 90°. The workspaces are simulated using 300×300 input pairs of the pulley angles (resolution of 0.6° and 0.9° for spool ranges ±90° and ±135°, respectively). The coordinate frame origin is the R3RT Joint 1. The ±135° spool rotation range is associated with the maximum R3RT workspace possible without Link 12 contacting the rigid housing 2.

A robot's COM workspace is defined by its range of motion, mass distribution, link geometry, and the number of in-dependently actuated tail segments. For the R3RT system 1, the COM workspace, with no added tip-mass, is simply the end-effector workspace scaled down as shown in FIG. 9. In a single plane, the R3RT COM workspace spans 190°. However, planar pendulum-like tails' COM workspace is a circular arc, as shown in FIG. 9; for spatial pendulums, this workspace becomes a spherical surface. Comparatively, the R3RT system 1 possesses a higher dimensionality end-effector workspace due to its increased articulation and ability to achieve two mode shapes. As a result, the R3RT system 1 has significantly greater ability to adjust its COM by changing the distance between the COM and tail base.

Figure 10:
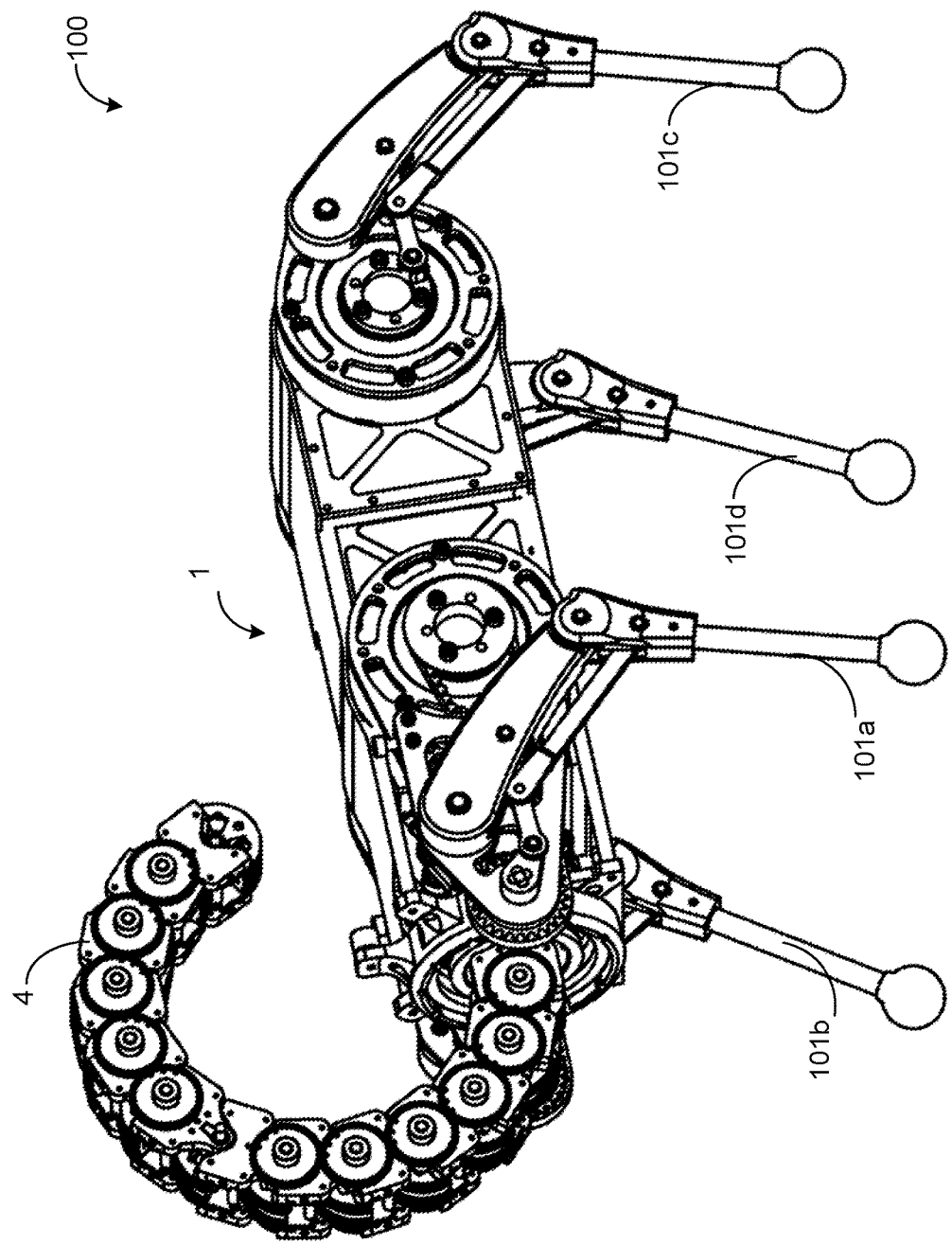
FIG. 10 is a perspective view of a quadruped integrated with the multi-link robotic tail system shown in FIG. 1 in accordance with a representative embodiment.

FIG. 10 is a perspective view of a quadruped integrated with the R3RT system 1 in accordance with a representative embodiment. The R3RT system 1 is mounted on-board a four-legged robot 100 capable of running using single-DOF legs 101a-101d that utilize dc motors (e.g., high-power Maxon brushless dc motors) to propel the robot 100. The robotic tail 4 aids in stabilization and maneuvering of the robot in accordance with the features described above with reference to FIGS. 1-9. It should be noted that the tail 4 is not limited to being used with any particular type of robot, although it is particularly well suited for use with quadrupeds.

In accordance with a second representative embodiment of the robotic tail system, the multi-link robotic tail is a universal spatial robotic tail (USRT) with a spatial workspace capable of generating controlled spatial loading (relative to the yaw, pitch, and roll principle axes). The USRT is an underactuated, cable-driven serial robot capable of generating dynamic and quasi-static loading capable of assisting in the maneuvering and stabilization of mobile robots. The USRT utilizes universal joints between its links to generate a spatial workspace for the tail capable of applying yawing, pitching and rolling moments to the mobile robot (e.g., a quadruped) to which it is attached. Elasticity between the links is achieved using compression springs for bending resistance and extension springs for gravity compensation. A representative embodiment of the USRT system will now be described with reference to FIGS. 11-18.

Figure 11:
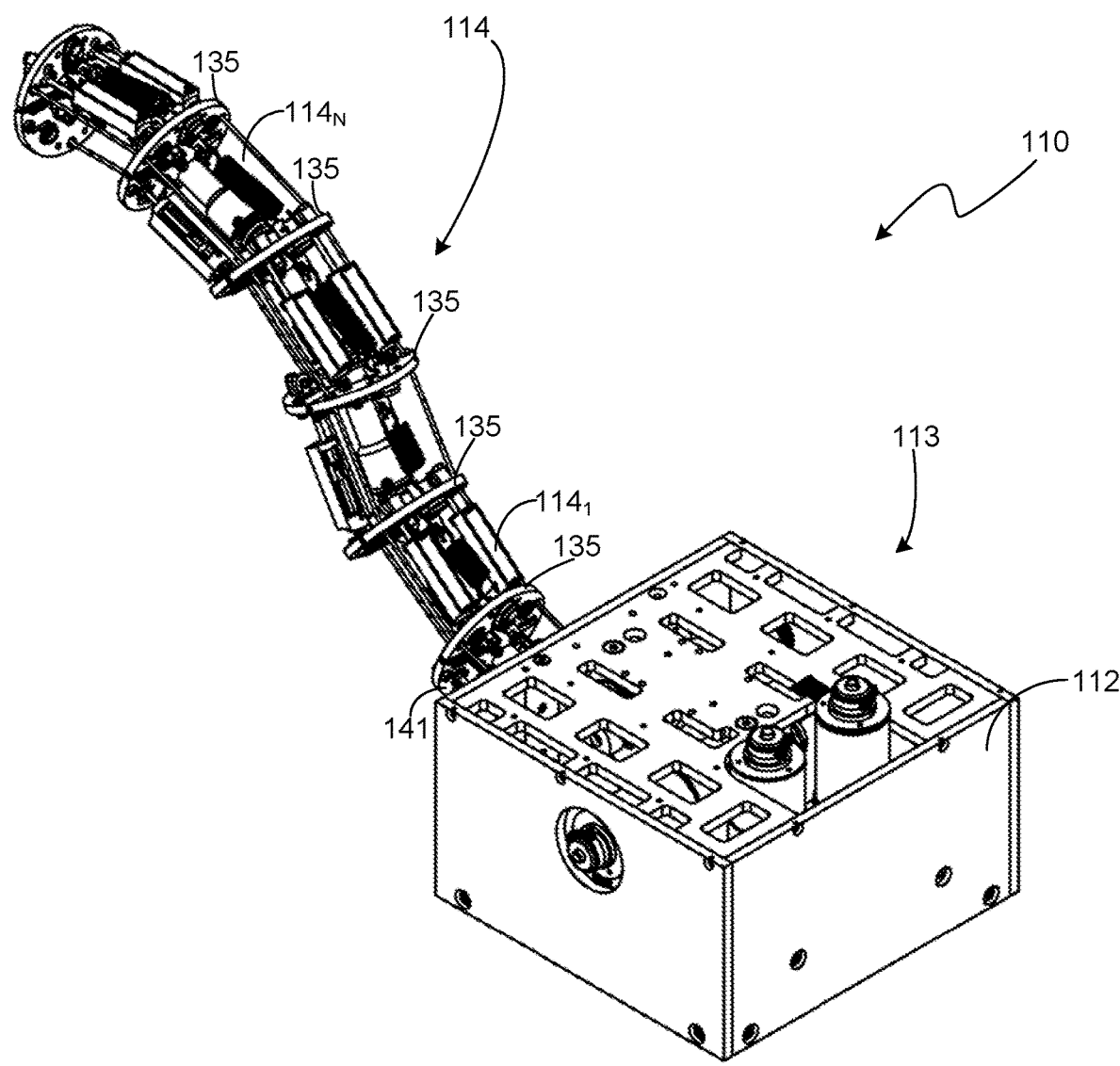
FIG. 11 is a side perspective view of the articulated multi-link robotic tail system in accordance with another representative embodiment.

FIG. 11 is a side perspective view of the USRT system 110 in accordance with a representative embodiment. The USRT system 110 utilizes universal joints between its links to generate the spatial workspace for the tail capable of applying yawing, pitching and rolling moments to the mobile robot to which it is attached. The USRT system 110 comprises a rigid housing 112, a tail actuation unit 113 housed inside of the rigid housing 112, and a robotic tail 114 comprising N tail segments $114_1$-$114_N$, where N is a positive integer that is greater than or equal to one. Each of the tail segments $114_1$-$114_N$ comprises i links, where i is a positive integer that is greater than or equal to two. In the embodiment shown in FIGS. 12A and 12B, N=2 and i=3.

Figure 12A:
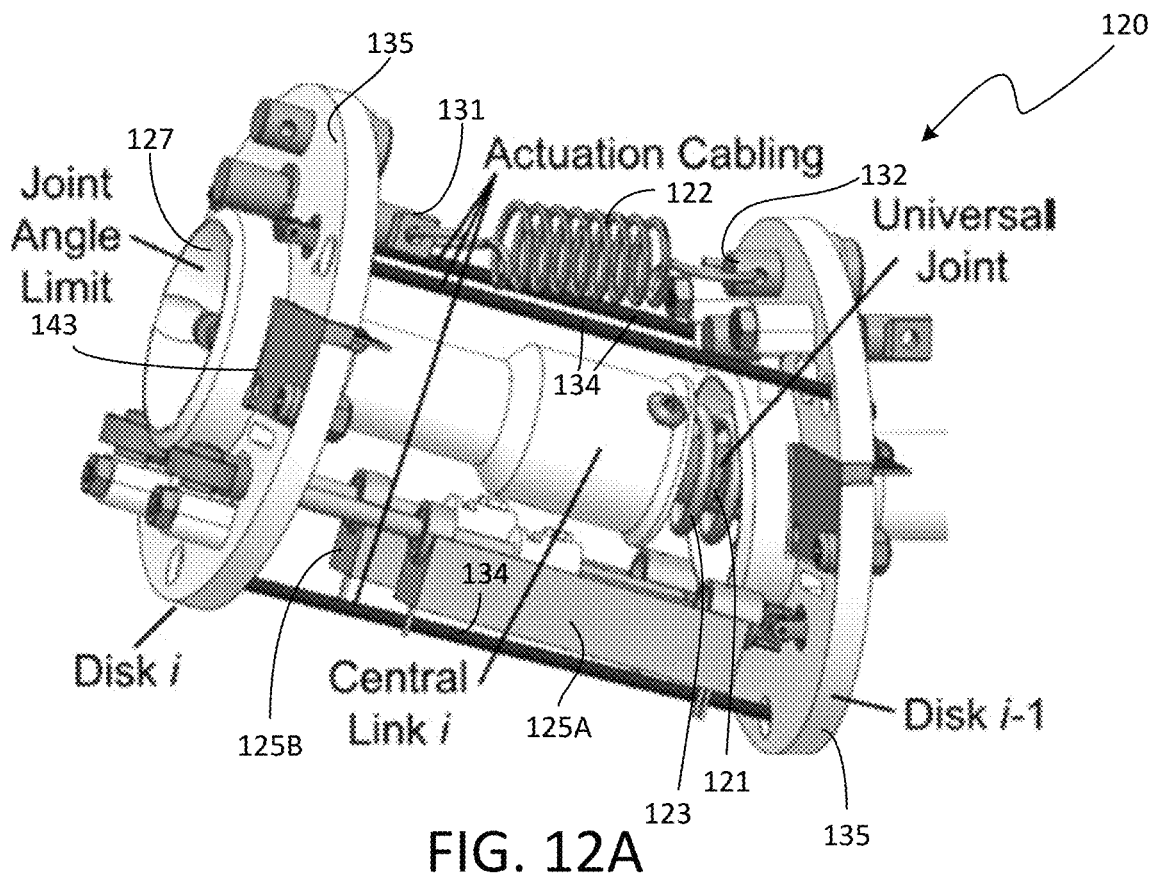
FIGS. 12A and 12B are side perspective views of one of the subsegments of the tail shown in FIG. 11 in accordance with a representative embodiment.
Figure 12B:
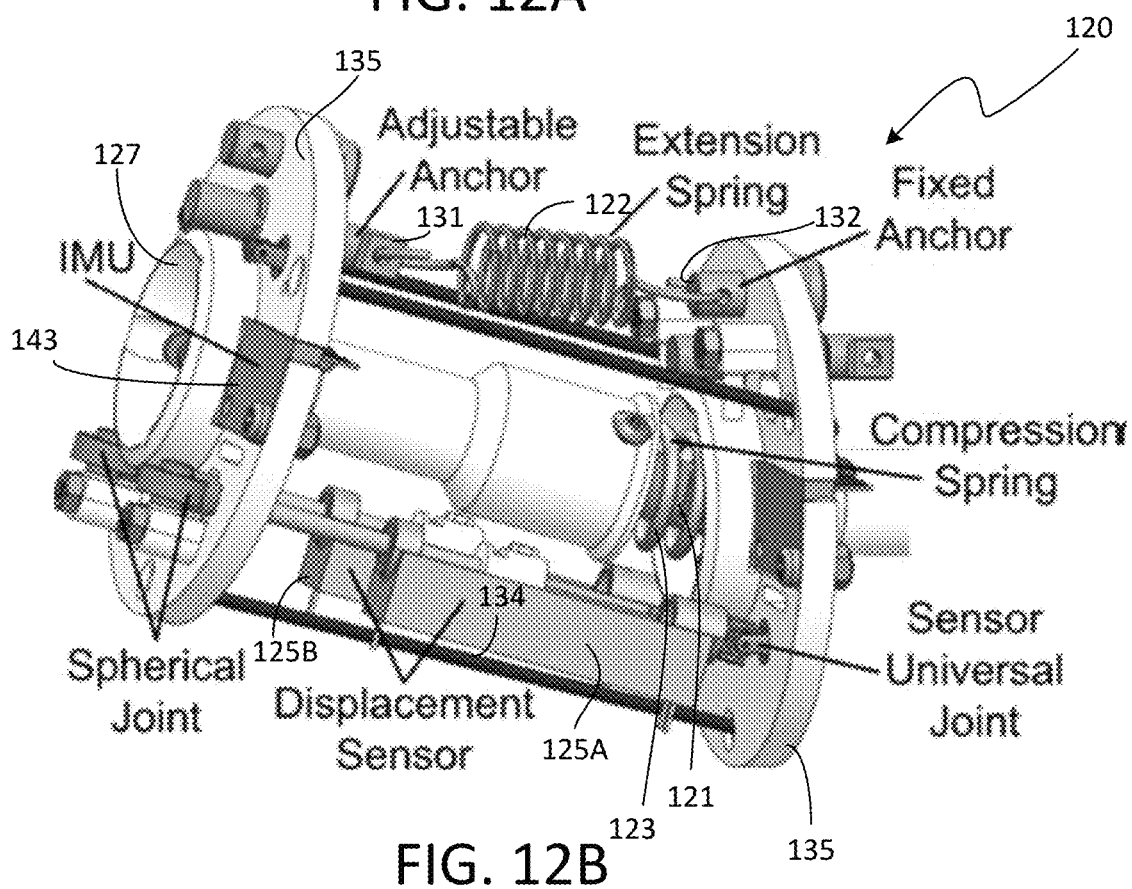

FIGS. 12A and 12B are side perspective views of one of the links 120 of the tail 114 shown in FIG. 11 in accordance with a representative embodiment. In FIGS. 12A and 12B, the link 120 is located in between disk i-1 and disk i. In addition to the universal joint 121 located in between these disks i-1 and i, an extension spring 122 and a compression spring 123 are mounted in between the disks, along with actuation cabling 124, first and second displacement sensors 125A and 125B, respectively, and a joint angle limit device 127. The joint angle limit device 127 prevents the angular displacement of the universal joint 121 from exceeding a fixed maximum angle. To implement the joint angle limit device 127, a pair of axisymmetric beveled surfaces are incorporated into the designs of disk i-1 and the base of central link i. The beveled surfaces are parallel and in contact when the joint angle limit is reached, and the axisymmetric design allows the surface to "roll" along the mated beveled surfaces at the maximum deflection as the joint's pitch and yaw angles are varied. This provides a uniform maximum workspace for each joint when planning the motion of the robotic tail 114 and obviates the need for the displacement sensors 125A and 125B to stop joint motion at their limits.

Two sources of elastic loading are incorporated into each subsegment: (1) the compression spring 123 surrounding the universal joint 121 that resists bending equally in all directions as the universal joint 121 deflects; and (2) the extension spring 122 mounted between adjacent links to help compensate for gravitational loading. The compression spring 123 provides a compact mechanism of distributing actuation loading within an actuated segment. The compression springs 123 provide axisymmetric mechanical coupling between links to prevent the cable actuation from only causing bending in a single joint (the extension spring only acts in the pitch direction). The compression spring 123 is housed within the central link, and the portion exposed between adjacent links contributes to the bending resistance.

The extension spring 122 modifies the joint's elasticity in the pitch direction to help offset the effect of gravity. Because of differences in gravitational moments at joints along the robotic tail 114 (i.e., the gravitational moment near the base is significantly higher than the gravitational moment near the tip), the elastic loading required from this spring in each joint varies. This variation in elastic loading can be achieved by varying the springs' stiffnesses, unloaded lengths, and/or anchor-point distances. Spring stiffness and unloaded length are functions of the spring chosen for inclusion in the design. For a fixed unloaded length, higher stiffnesses correlate to higher forces, and for a fixed stiffness, shorter unloaded lengths generate higher forces for a fixed distance between anchor points. As shown in FIG. 12B, in accordance with this embodiment the USRT design incorporates an adjustable anchor 131 to allow for variation of the distance between anchor points. This adjustable anchor 131 is a passive mechanism for adjusting the extension spring 122 loading, i.e., it is not actuated and is not changed during the robot's motion. The fixed anchor 132 in FIG. 12B is designed such that the spring anchor point is an equal distance from the disk surface as the central universal joint. This minimizes the effect of the extension spring 122 on yaw-direction loading. In addition, there is sufficient clearance in the extension spring anchor holes to accommodate the springs' motion without generating undesired friction.

In accordance with a representative embodiment, an actuated segment $114_i$-$114_N$ is created by ending, or tying off, sets of three actuation cables 134 at a specific disk 135. The first actuated segment is from the base 141 of the robotic tail 114 to the first disk 135 to which cables 134 are tied off, and subsequent segments are from the previous segment's terminal link to the next link at which cables are tied off. Actuation is applied by three cables routed through holes at a fixed radius with 120° between holes around the center of the disk 135. Cables 134 terminating in different segments may be co-routed through the same holes to simplify control. For example, in a two-segment structure, to account for the change in cable path lengths in segment 1 for segment 2 cabling, the prescribed segment 1 cable displacements can be added to the desired segment 2 cable displacements. During operation, in each segment, two cables 134 will be "active" (i.e., tensioned) and one cable 134 will be "passive." The active cables 134 will constrain the motion of the segment and dictate its shape. The passive cable 134 will follow the segment trajectory established by the other two cables. It is important that the passive cable 134 not overslack because the subset of two active cables 134 may change during the motion of the robotic tail 114.

The displacement sensors 125A and 125B integrated along the robotic tail 134 allow for estimation of the joint angles and velocities of each universal joint 121. The first and second displacement sensors 125A and 125B are mounted between the disks 135 separated by each joint to measure the distances between pairs of fixed points on each disk 135. These distances can be used to analytically calculate the pitch and yaw joint angles of the universal joint, providing a mechanism for sensing the real-time configuration of the robotic tail 114. In accordance with this embodiment, an inertial measurement unit (IMU) 143 that includes a gyroscope is also mounted to each link. Utilizing the body-fixed angular velocity measurements from the gyroscope, along with the estimates of the relative pitch and yaw of adjacent links from the displacement sensors 125A and 125B, the universal joint pitch and yaw velocities may also be estimated.

Figure 13:
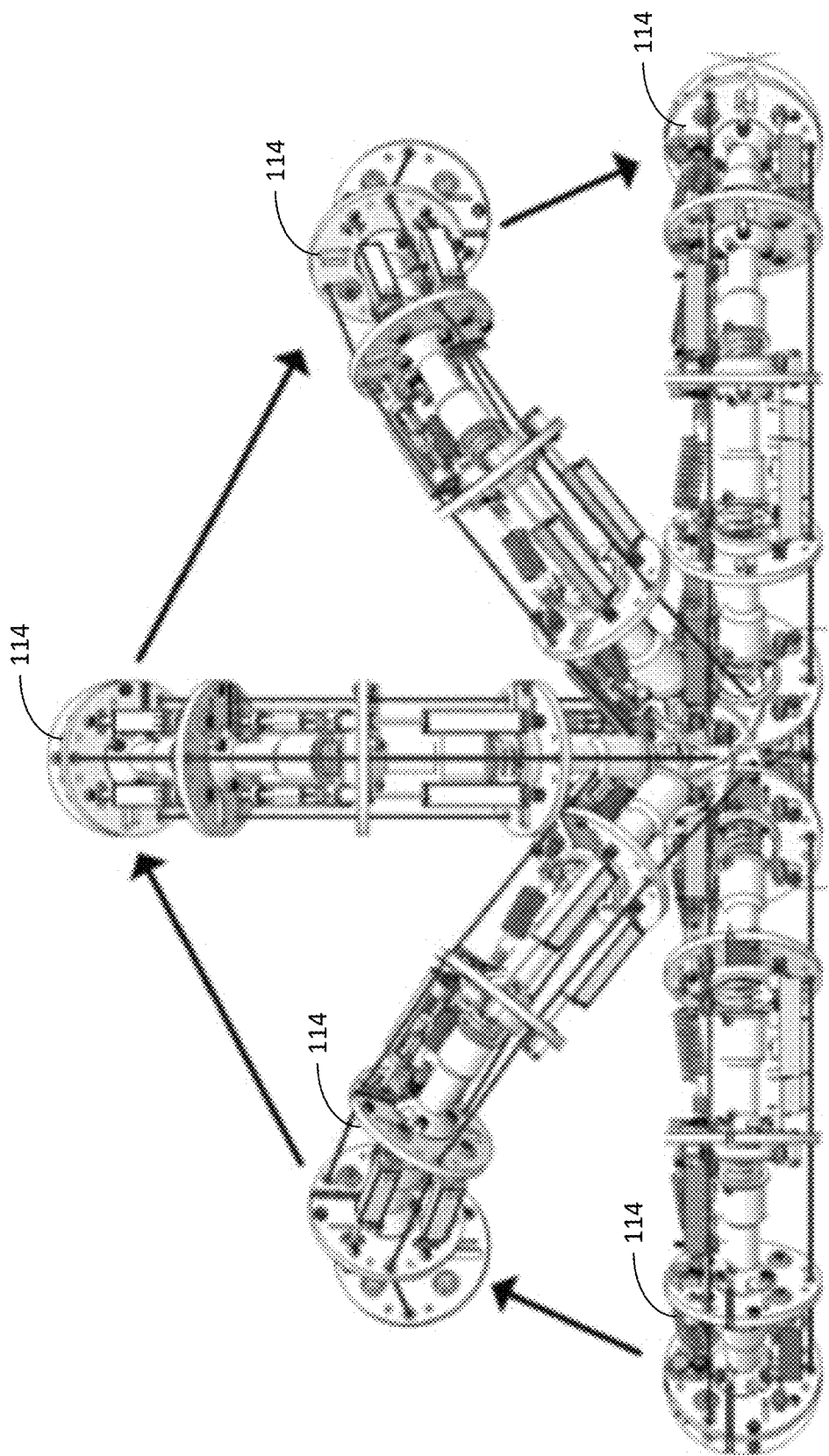
FIG. 13 is a front perspective view of the robotic tail shown in FIG. 11 that shows the rolling motion of the tail through −180° with the tail bent 180°, shown in 45° increments.

FIG. 13 is a front perspective view of the robotic tail 114 that shows the rolling motion of the tail 114 through −180° with the tail 114 bent 180°, shown in 45° increments.

Figure 14:
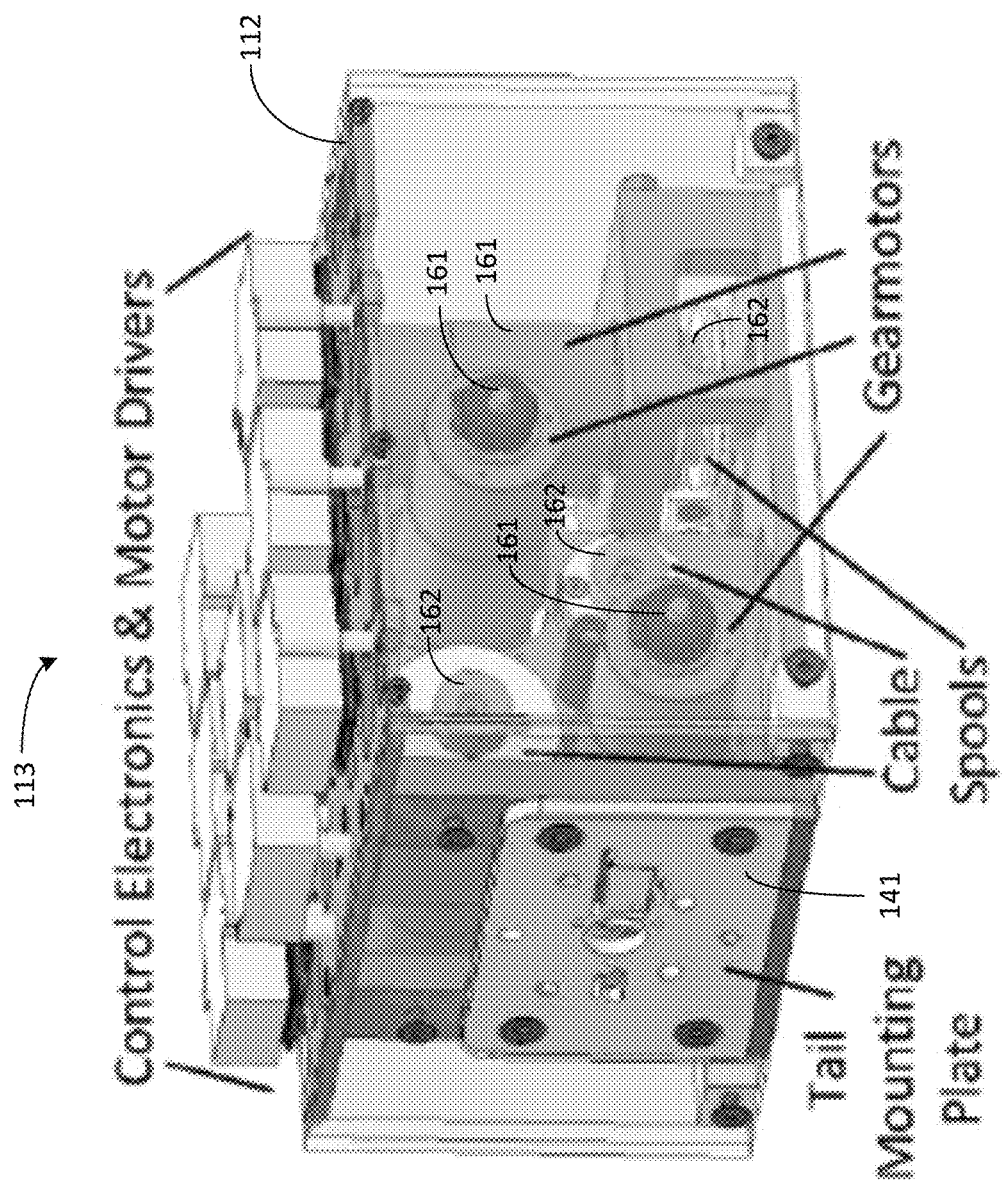
FIG. 14 is a side perspective view of the actuation unit 113 disposed inside of the rigid housing of the robotic tail shown in FIG. 11 in accordance with a representative embodiment.

FIG. 14 is a side perspective view of the actuation unit 113 disposed inside of the rigid housing 112 in accordance with a representative embodiment. In accordance with this embodiment, six gear motors 161, only three of which are visible in FIG. 14, are used to drive respective cable spools 162 that control the displacement trajectories of the tail's actuation cabling 134. For this embodiment, higher-torque, lower-speed motors are used for the segment 1 cabling 134, due to the segment's relatively lower cable speed requirement (due to the actuation cabling routing through only three links) and relatively higher cable force requirement (due to the segment motion moving both the mass along segment 1, as well as segment 2). For the segment 2 cabling 134, higher-speed, lower torque motors are preferably utilized due to the actuation cables 134 routing through all of the links and the need to only generate motion in the terminal links.

Figure 15:
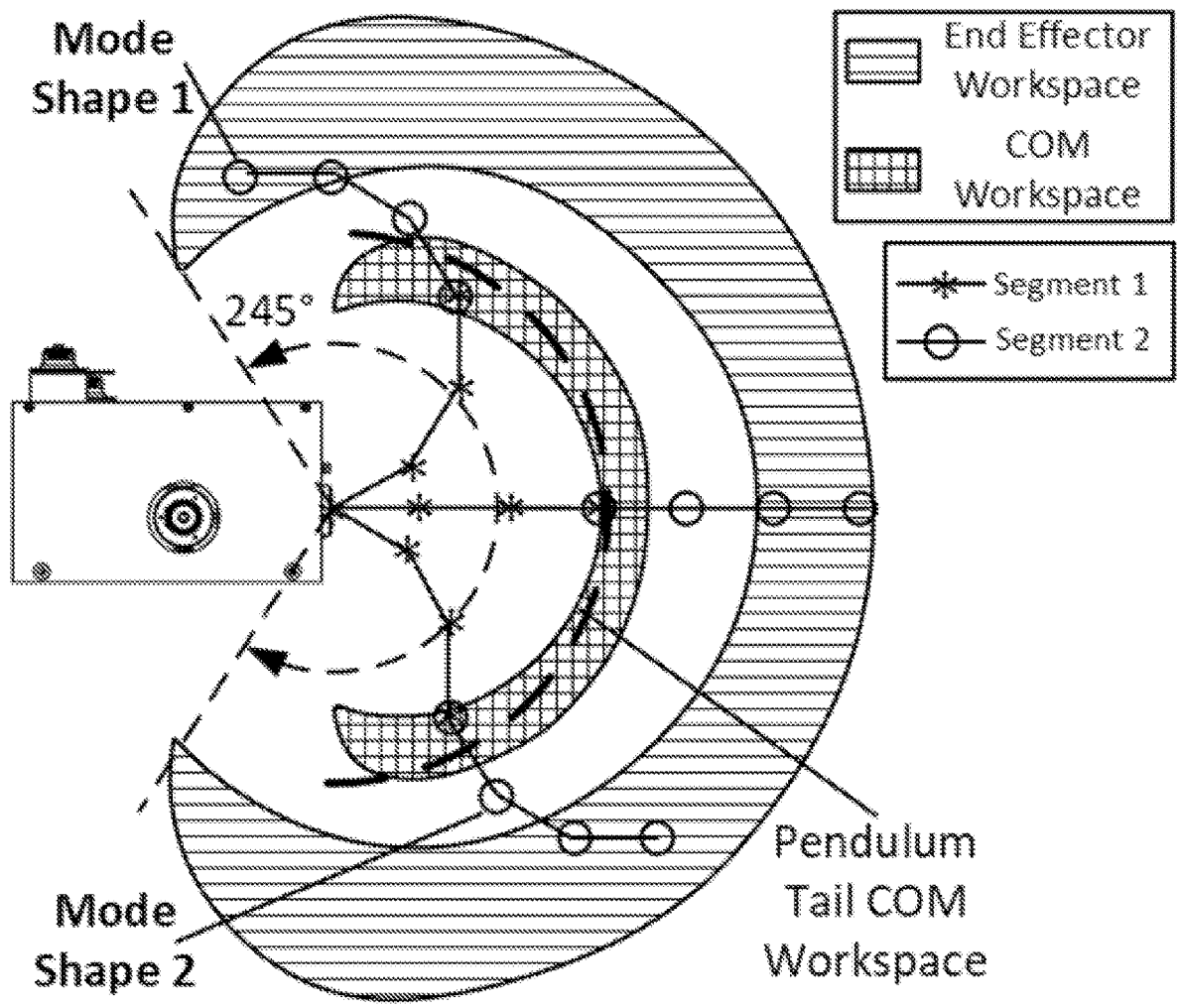
FIG. 15 is a plot of the workspace and mode shapes obtained through simulation of the multi-link robotic tail system shown in FIG. 11 in accordance with another representative embodiment.

FIG. 15 is a plot of the workspace and mode shapes obtained through simulation of the USRT system 110. The geometric, mass, and elastic properties used in these simulations have been extracted from a prototype of the USRT system 110 and its associated CAD model.

The USRT system 110 is an articulated structure that can form spatial, multicurvature configurations that provide enhanced performance with a larger workspace compared to the pendulum-like robotic tails previously discussed. For the USRT system, the end-effector workspace is the locus of points that the terminal link (link 6 in this embodiment) can reach, which depends on the link geometry and maximum universal joint deflection angle. The COM workspace of the USRT system 110 is the locus of points the robot tail's COM can reach, which depends on the link geometry, maximum universal joint deflection angle, and the robotic tail's mass distribution. Using the USRT system's geometric and mass properties defined in Table 3, FIG. 15 illustrates a cross section of the USRT system's end-effector and COM workspaces taken in the x1-z1 plane, with the coordinate frame's origin taken at joint 1. The spatial volumetric workspaces can be obtained by revolving these areas about the $z_1$-axis.

Since the robotic tail 114 is composed of two active segments in this embodiment, it can produce two distinct mode shapes, mode shapes 1 and 2. Mode shape 1 is illustrated as a C-curve where the segments bend in the same direction, and mode shape 2 is illustrated as an S-curve where the segments bend in opposite directions. Between these two mode shapes, intermediate mode shapes can be achieved in which the bending planes of the two segments have an angular offset.

For the single-mass pendulum-like robotic tails discussed above, both the end-effector and COM workspaces are equivalent since the tail COM is located at its end-effector (i.e., the tip of the pendulum). In the planar cross section shown in FIG. 15, the pendulum robotic tail workspace is a circular arc. If this pendulum was 2DOF with a universal joint, the spatial workspace would be a spherical shell. In comparison, the USRT system 110 produces volumetric COM and end-effector workspaces, which provide a wider range of potential trajectories for driving the robotic tail 114, and by extension, loading the mobile robot to which it may be attached.

The shape, scaling, and placement of the COM workspace of the USRT system 110 may be adjusted by adding additional mass to the robotic tail 114 and/or redistributing the mass. Of particular interest is the ability to add mass to link 6, such that the COM workspace expands and shifts toward the end-effector workspace. Devising the optimal length, total mass, and mass distribution of the USRT system 110 is a key advantage of the USRT system 110.

The primary application of the USRT system 110 is as a robotic tail to aid in maneuvering and stabilization of a mobile robot to which the system 110 is attached. For yaw-angle maneuvering, the tail 114 will rapidly move in the plane horizontal to the ground to induce a yaw-angle rotation in the body of the mobile robot either while it is stationary or moving. For stabilization, the tail 114 will respond to detected instabilities in either the pitch- or yaw-direction and generate either dynamic loading through a rapid tail motion or quasi-static loading through a change in the tail's COM position relative to the mobile robot body COM. Beyond these two applications, this USRT system 110 could also be used as a whole-arm manipulator, or could have an end-effector module incorporated for serial manipulation. It should be noted, however, that these are only examples of possible applications of the USRT system 110 and that the system 110 is not limited with respect to the application in which it is employed.

Figure 16:
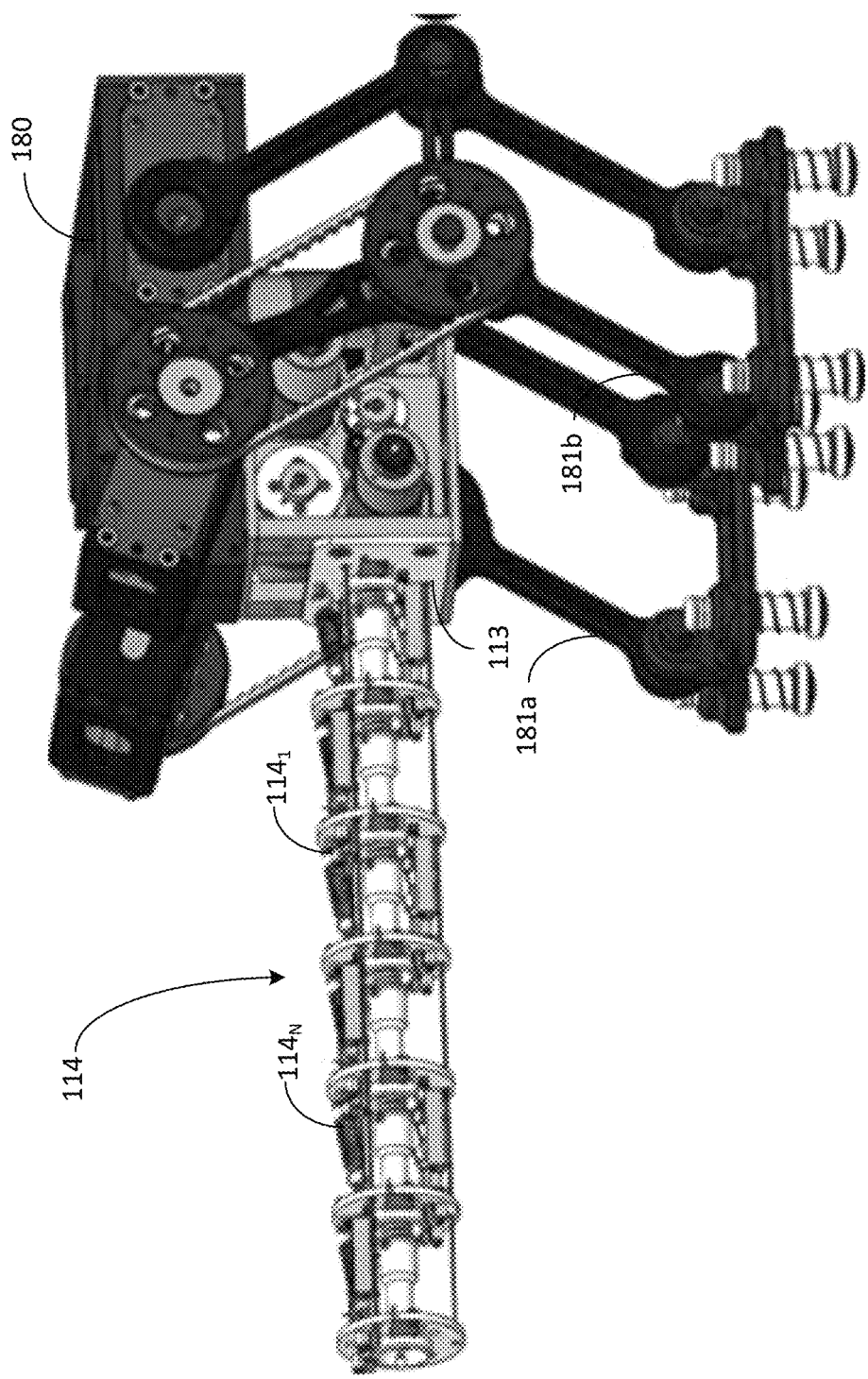
FIG. 16 is a perspective view of a biped integrated with the multi-link robotic tail system shown in FIG. 11 in accordance with another representative embodiment.

FIG. 16 is a perspective view of a biped 180 integrated with the USRT system 110 in accordance with a representative embodiment. The USRT system 110 is mounted on-board a two-legged biped robot 180 capable of running using single-DOF legs 181a and 181b that utilize dc motors (e.g., high-power Maxon brushless dc motors) to propel the robot 180. The robotic tail 114 aids in stabilization and maneuvering of the robot 180 in accordance with the features described above with reference to FIGS. 11-15. It should be noted that the tail 114 is not limited to being used with any particular type of robot, although it is particularly well suited for use with quadrupeds, bipeds and other mobile robots.

In accordance with a third representative embodiment of the robotic tail system, the multi-link robotic tail is a bidirectional cable-driven articulated robotic tail (BC-DART). The BCDART system is a cable-driven serial robotic system whose typical application is to maneuver and stabilize a mobile robot. This has a specifically-designed universal joint having two perpendicular circular cable guide slots. This unique feature guarantees that the same driven cable set maintains a constant length under universal rotations, thus allowing the actuation number to be reduced to two, compared with the commonly used three actuations. Although the BCDART is designed as a robotic tail, the BCDART system has potential value as a cable-driven serial manipulator, and the specifically-designed universal joint can be used to replace current robotic waist or other 2 DOF joints in humanoid robots.

The BCDART has a spatial workspace capable of generating controlled spatial loading (relative to the yaw, pitch, and roll principle axes). The BCDART is an underactuated, cable-driven serial robotic tail capable of generating dynamic and quasi-static loading capable for assisting in the maneuvering and stabilization of mobile robots. A representative embodiment of the BCDART system will now be described with reference to FIGS. 17-20.

Figure 17:
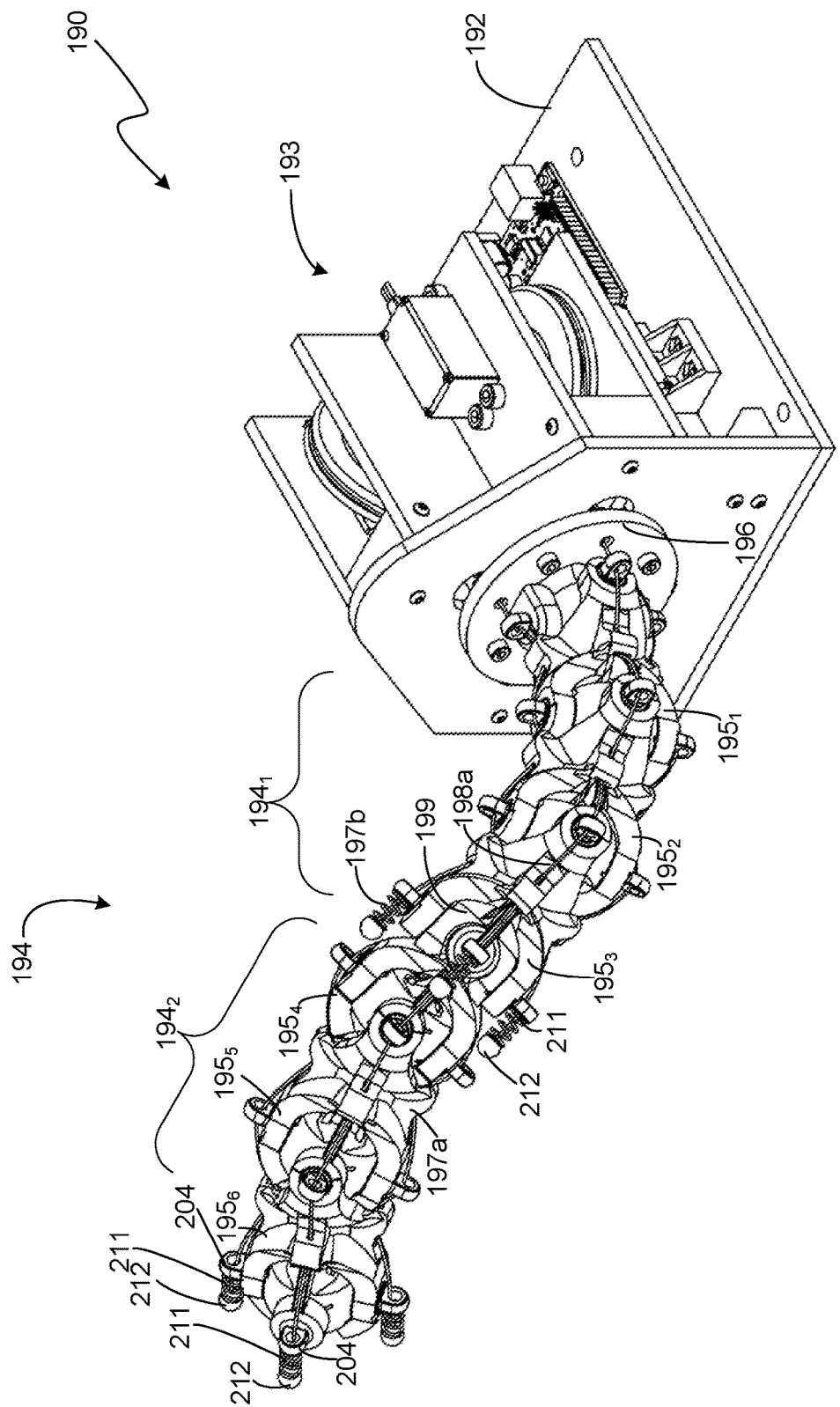
FIG. 17 is a perspective view of the articulated multi-link robotic tail system in accordance with another representative embodiment.

FIG. 17 is a perspective view of the BCDART system 190 in accordance with a representative embodiment. The BCDART system 190 utilizes universal joints between its links to generate the spatial workspace for the tail capable of applying yawing, pitching and rolling moments to the mobile robot to which it is attached. The BCDART system 190 comprises a rigid housing 191, a tail actuation unit 193 housed inside of the rigid housing 192, and a robotic tail 194 comprising N tail segments $194_1$-$194_N$, where N is a positive integer that is greater than or equal to one. Each of the tail segments $194_1$-$194_N$ comprises i links 195, where i is a positive integer that is greater than or equal to two. In the embodiment shown in FIG. 17, N=2 and i=6.

The links $195_1$-$195_3$ and links $195_3$-$195_6$ of the segments $194_1$ and $194_2$, respectively, can provide 2 DOF bending independently, namely yaw and pitch. Therefore, the BCDART 194 is able to achieve a 4 DOF bending motion in total. In accordance with a representative embodiment, actuation is achieved using four actuators in the actuation unit 193. The same as the USRT described above, the rolling motion can be achieved by combining the yaw bending and the pitch bending. A housing module 196 of the BCDART 194 that couples to the rigid housing 192 is considered part of the first segment $194_1$ and an adapter module 199 that interconnects the first and second segments $194_1$ and $194_2$, respectively, is considered part of the second segment $194_2$. The housing module 196 and the adapter module 199 are the start points for the first and second segments $194_1$ and $194_2$, respectively.

For each segment $194_1$ and $194_2$, two sets of cables are used to drive the bidirectional motion of both yaw and pitch bending. For example, for the first segment $194_1$, a cable set having cables 197A and 197B belong to one set (cable set A) while the cable set having cables 198A and 198B belong to another set (cable set B). Cable 198B is not visible in FIG. 17 because it is located on the side of the BCDART 194 that is not visible in FIG. 17. Thus, based on the cable length invariance property, both cable sets keep a constant total length during motion.

The design is intended to achieve modularity so that the BCDART 194 can be extended easily. In addition, modularity facilitates manufacturing and enhances the exchangeability of parts. Therefore, each segment $194_1$-$194_N$ is designed to be as symmetric as possible. In accordance with an embodiment, four different types of modules are used to construct the BCDART 194, namely, link modules A and B, which together form a link $195_1$-$195_i$, the housing module 196 and the adapter module 199. The link modules A and B serve as the building blocks of the BCDART 194. In accordance with this embodiment, modules A and B are designed such that module B is able to rotate ±90° with respect to the module A. This allows a ±90° bending (pitch) in total for the first segment $194_1$ and +180° bending (yaw) in total for the entire BCDART 194. The adapter module 199 serves as adapter from the previous segment (first segment $194_1$) to the next segment (second segment $194_2$). Therefore, the adapter module 199 can be partitioned in the middle with the first half of the adapter module 199 connecting with module A and the second half connecting with module B. Another important function of the adapter module 199 is to distribute the cables 197A, 197B, 198A and 198B coming from the center hole of the previous segment (first segment $194_1$ in this example) to drive the following segment (second segment $194_2$ in this example). Additional details of the adapter module 199 and of the segment cable routing are described below with reference to FIGS. 18 and 19. The housing module 196 is used to connect the first segment to the rigid housing 192 of the actuation unit 193, and thus it is only used once in the BCDART structure.

Figures 18A, 18B:
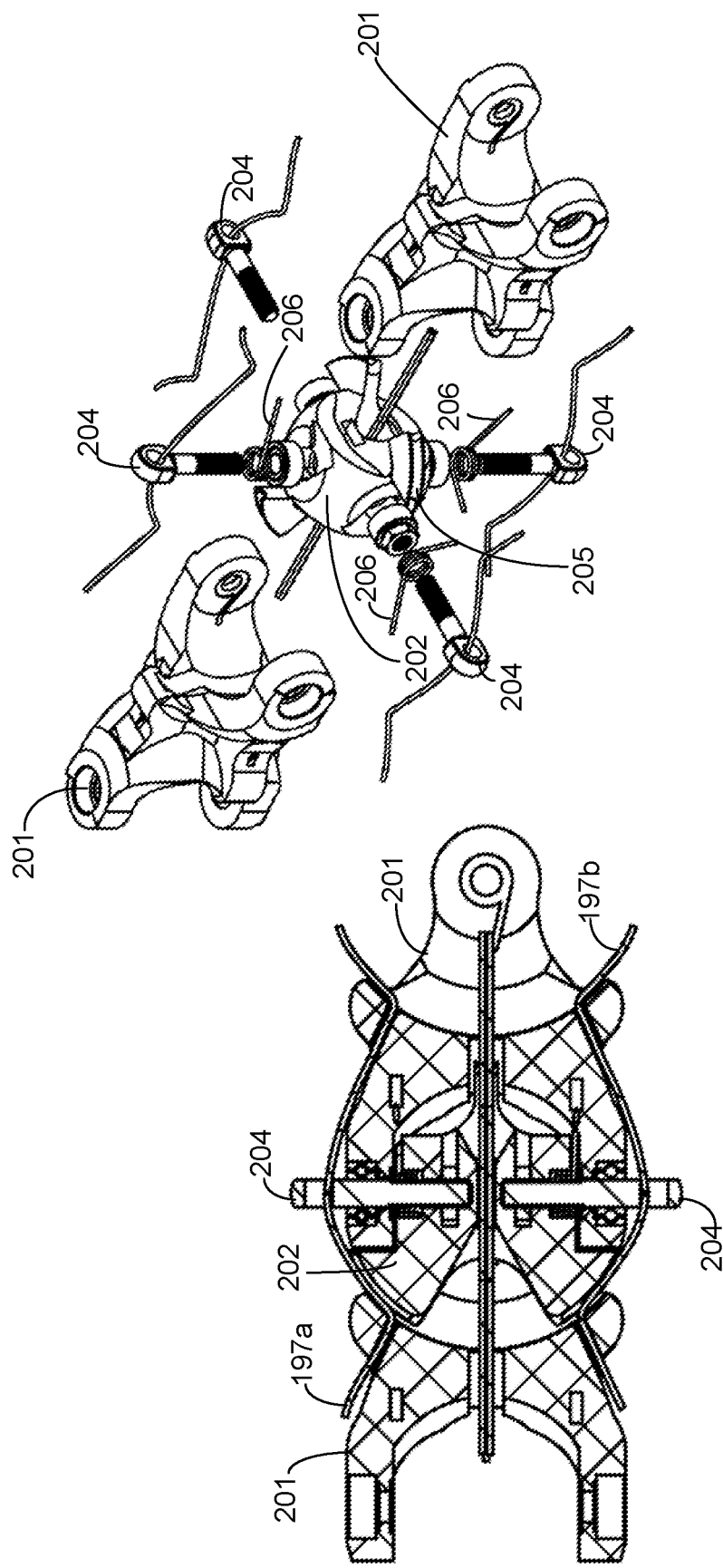
FIG. 18A is a top cross-sectional view of one of the links of the multi-link robotic tail shown in FIG. 17.
FIG. 18B is an exploded perspective view of the link shown in FIG. 18A.

FIG. 18A is a top cross-sectional view of one of the links 195 shown in FIG. 17. FIG. 18B is an exploded perspective view of the link 195 shown in FIG. 18A. Each link 195 in the BCDART 194 other than the last link $195_i$ in the last segment $194_N$, is made up of a pair of link module B 201 and one link module A 202. Module A 202 has two sets of perpendicular mounting holes to mount four eye bolts 204 and two sets of perpendicular circular cable guide slots 205 to guide the two cable sets 197A, 197B, 198A and 198B. Module A 202 has a spring mounting slot that is adapted to mount one leg of a torsion spring 206. The center hole of the module A 202 is adapted to allow the cables for the following segment to pass through it. Moreover, due to the rotation of module B 201 relative to module A 202, each set of circular cable guide slots is divided into two halves so that they will not block the center cables during motion.

Module B 201 is designed to have the complementary mounting structures to module A 202. For instance, the cable guide hole on module B 201 is made to work with the circular cable guide slot of module A 202 to guide the cable to next segment. Also, module B 201 has a center hole to allow the cables for the next segment to pass through module B 201. By designing module A 202 and module B 201 in this way, the segment mechanism possesses the cable length invariance feature.

With reference again to FIG. 17, at the end of each cable, a pretightening spring 211 and a cable terminal 212 secure the cable ends to a respective eye hole of a respective eye bolt 204 to ensure cable tension. Between adjacent eyebolts 204, extensional springs (hidden in FIG. 17 to provide a better view of cable routing) are utilized to compensate the gravity and backbone elasticity.

Figure 19C:
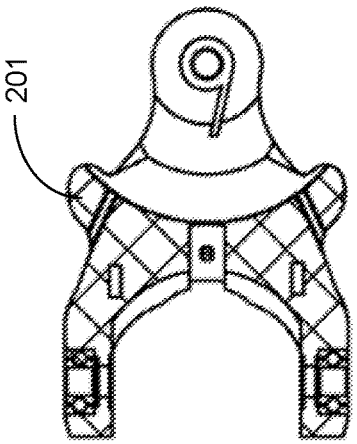
FIG. 19C is a cross-sectional top view of module B shown in FIG. 19A coupling with the housing module.
Figure 19A:
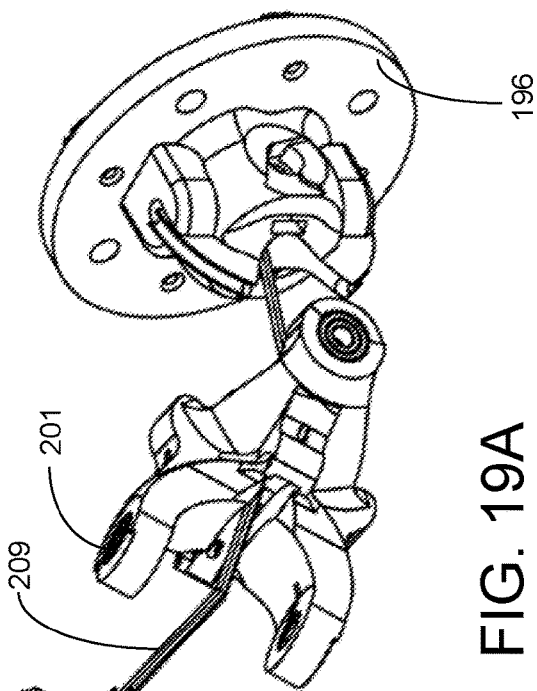
FIG. 19A is a perspective view of a portion of the multi-link robotic tail shown in FIG. 17 that shows the coupling of the adapter module with link module A and the coupling of the housing module with link module B.
Figure 19B:
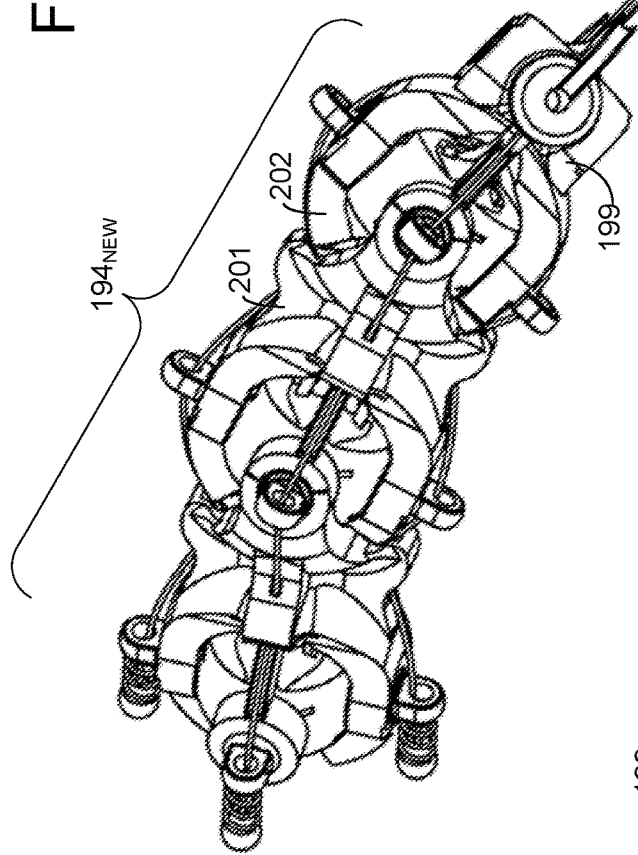
FIG. 19B is a cross-sectional top view of the adapter module shown in FIG. 19A.
Figure 19B:
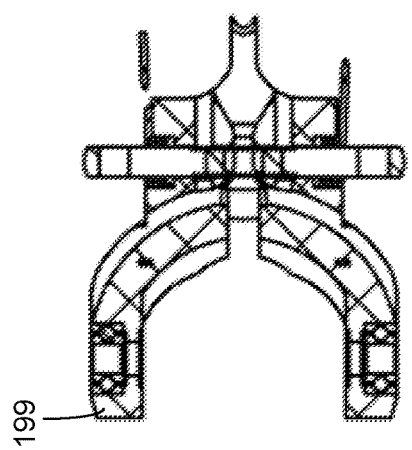

FIG. 19A is a perspective view of a portion of the BCDART 194 that shows the coupling of the adapter module 199 with module A 202 and the coupling of the housing module 196 with module B 201. FIG. 19B is a cross-sectional top view of the adapter module 199 shown in FIG. 19A. FIG. 19C is a cross-sectional top view of module B 201 shown in FIG. 19A coupling with the housing module 196. A new segment $194_{NEW}$ can be added to the current BCDART 194 by mounting an adapter module 199 at the beginning of the new segment $194_{NEW}$ and routing the driving cables through neutral path 209, as shown in FIGS. 19A and 19B. The neutral path 209 is defined as the line segments going through the centers of all of the module As 202. These points are depicted in FIG. 19A as $O_1$, $O_2$. Since $O_1$, $O_2$ are fixed points on module B 201, the neutral path consisting of these fixed distance line segments maintains a constant length during tail motion. Routing cables in such a way guarantees that the new segment cables are not affected by the motion of the previous segments. The cross-sectional view of FIG. 19B also shows the manner in which the adapter module 199 distributes the center cables to the outside of the segment.

Figure 20:
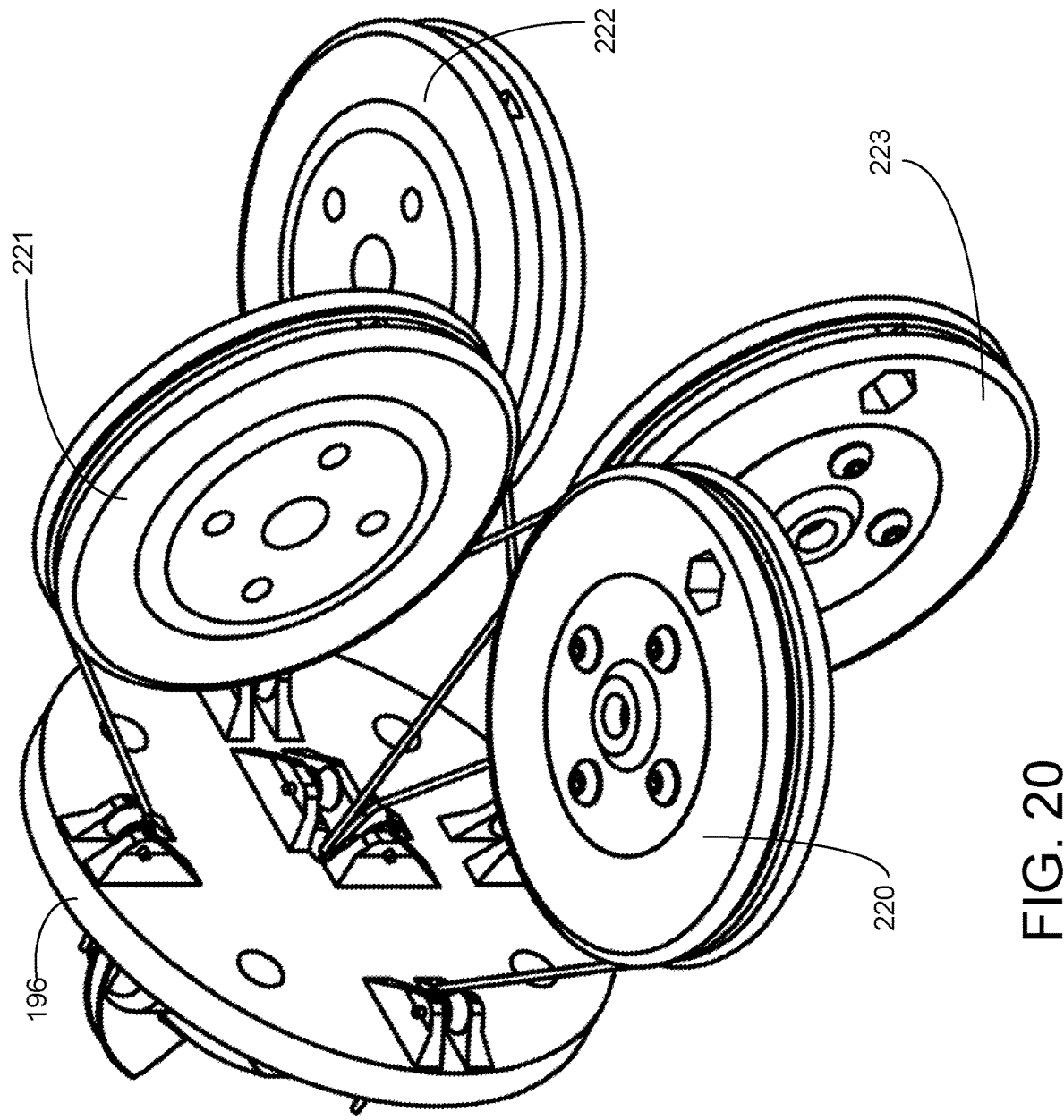
FIG. 20 shows the arrangement of the four pulleys of the actuation unit shown in FIG. 17 and the corresponding cables routings around the pulley.

FIG. 20 shows the spatial relationship between pulleys 220-223 of the actuation unit 193 and the housing module 196 and shows the way in which the cables on the respective pulleys 220-223 are routed by the housing module 196 into module B 201 (FIG. 19A). Because each segment comprises two or more links, there are more DOFs than there are actuators. Therefore, to make the system determinant, additional constraints must be met. These constraints are met by using elastic elements, such as springs, for example.

In accordance with an embodiment, two kinds of springs are used for this purpose. Torsional springs are used in module A 202 serving as the basic elastic backbone of the BCDART 194 and extensional springs are disposed between adjacent eyebolts 204 serving to compensate for the gravity, friction, and the stiffness differences of torsional springs due to manufacturing. The torsional springs are designed to have the same stiffness and their mounting positions are depicted in FIG. 19B, in which four 90° right-hand torsion springs 206 are used for each segment and mounted symmetrically on module A 202 (a spring mounting slot) and module B 201 (a corresponding spring mounting hole to mount the two spring legs). For the extensional springs, the stiffness may be determined by experimentally adjusting the joint stiffness until they have the desired stiffness. The pretightening forces are determined by examining the different gravitational and frictional forces along the tail so that the tail maintains its natural position (the natural position is the pose when the yaw and pitch angles for each joint are all zero, i.e., the horizontal and straight pose) when the motors of the actuation unit 193 are turned off.

Credited to the unique cable routing profile of the BCDART system 190 described above, as few as two motors may be used for actuating each segment 194$_1$ and 194$_2$. Therefore, in accordance with this embodiment, the BCDART system 190 uses four actuators in total to drive the four sets of cables independently. FIG. 20 shows the arrangement of the four pulleys and the corresponding cables routings around the pulley. In FIG. 20, cables with the same label belong to the same cable set. For instance, the two horizontally aligned P1 labels indicate that they belong to the same cable set, i.e., the cable set B for the first segment 194$_1$ (driven by Pulley 1). Similarly, the cable with label P2 belongs to the cable set A for segment 194$_1$ (driven by Pulley 2). Cable P3 belongs to the cable set B for the second segment 194$_2$. Cable P4 belongs to the cable set A for the second segment 194$_2$.

In accordance with a fourth representative embodiment of the multi-link robotic tail system, the tail system utilizes rigid mechanisms to couple the motions between nth link and n+1$^{th}$ link rather than using cable actuation, where n is the position of the link in the tail and ranges from one to i, i being the total number of links in the tail. By doing so, the overall tail becomes a rigid mechanism that achieves quasi-uniform spatial bending for each segment and allows highly dynamic motions to be performed. Because the multi-link structure uses a rigid mechanism to transmit motion, the tail possesses both the single-link tail advantages (i.e., high frequency response and robust structure) and multi-link advantages (e.g., high momentum, dexterous mobility, etc.). The multi-link tail structure is able to generate high momentums while having a high stiffness. The design of the multi-link tail is based on a rigid coupling hybrid mechanism (RCHM) concept, as will be described below in more detail.

Figure 21:
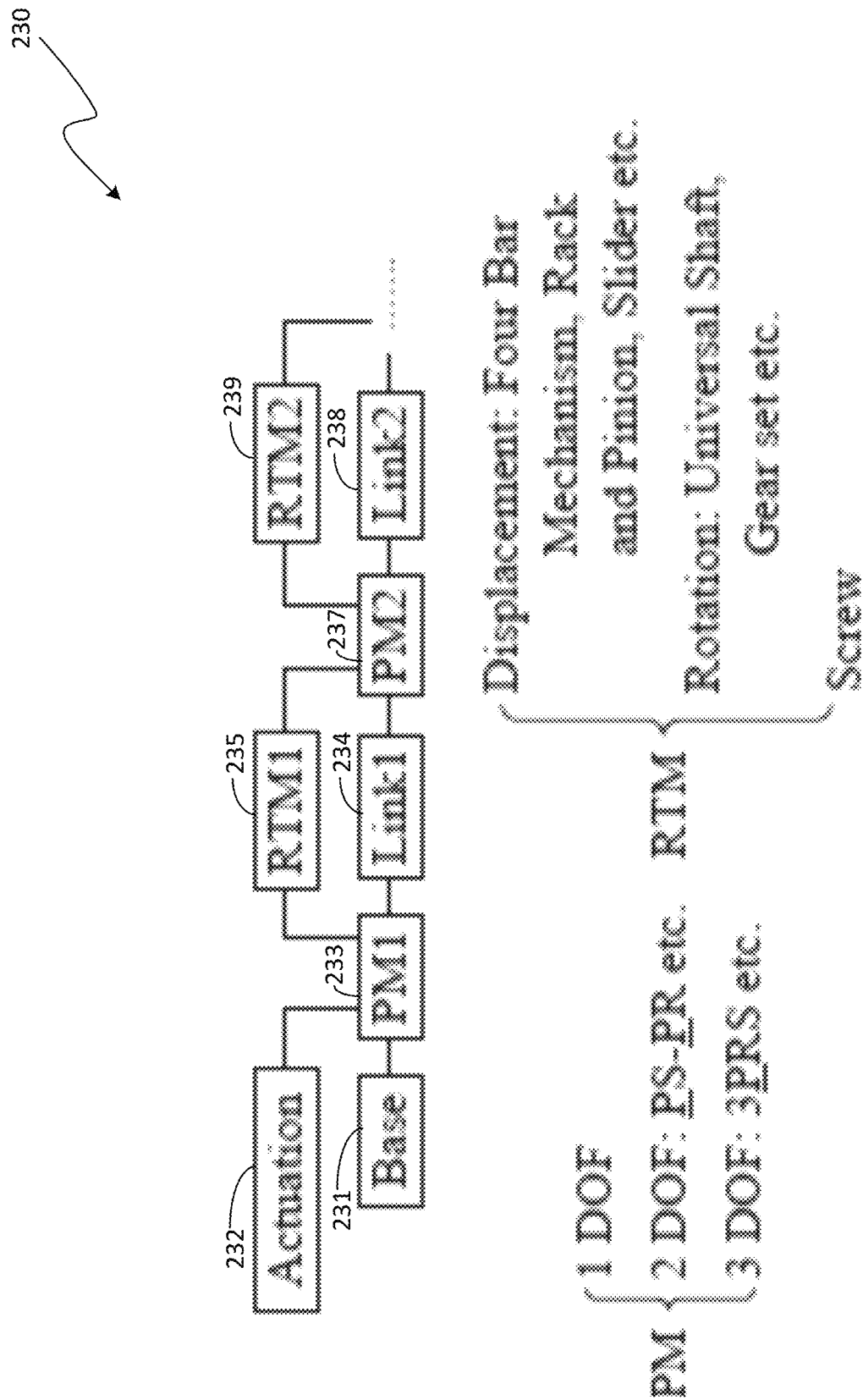
FIG. 21 is a block diagram representing a rigid coupling hybrid mechanism RCHM concept.

FIG. 21 is a block diagram representing the RCHM concept. One of the difficulties of implementing a multi-link tail that utilizes rigid mechanisms to couple motions between adjacent links is found in the transmission design, which requires transmitting motion for serially-connected spatial mechanisms. The RCHM concept addresses this difficulty. The core idea of the concept is to transmit motion from n$^{th}$ link to n+1$^{th}$ link instead of transmitting directly from the base to each link. This transmission is realized by utilizing a "rigid coupling" mechanism that couples the n+1$^{th}$ link motion with n$^{th}$ link motion. As for the basic mobility requirements, a parallel mechanism connects adjacent links to achieve the required mobility. For instance, a three DOF spatial RCHM may be designed as a serially-connected three DOF parallel mechanism with every adjacent parallel mechanism coupled by three rigid mechanisms.

As shown in FIG. 21, a complete RCHM 230 comprises five components: a base 231, an actuation unit 232, a first parallel mechanism (PM1) 233, a first link (Link1) 234, and a first rigid transmission mechanism (RTM1) 235, a second parallel mechanism (PM2) 237, a second link (Link2) 238, and a second RTM (RTM2) 239. The RTMs 235 and 239 realize the "rigid coupling" tasks for adjacent PMs while the PMs 234 and 237 realize the mobility tasks for the entire structure. Therefore, when linear actuators 251 and 252 (FIG. 22A) of the actuation unit 232 drive PM1 233, RTM1 235 will take advantage of the motion of PM1 233 to drive PM2 237. As long as PM2 237 moves, RTM2 239 transmits motion from PM2 237 to the following PM, PM3 (not shown), and so on and so forth.

There are many PM designs that can be used to achieve different mobility requirements, while there are only limited choices for RTM designs. FIG. 21 lists several of the most useful designs, including a four bar mechanism, a rack and pinion mechanism, a slider mechanism for displacement transmission, and the universal shaft, gear set, etc. for rotary transmission. For different applications, the PMs and RTMs can be the same or different.

Figure 22A:
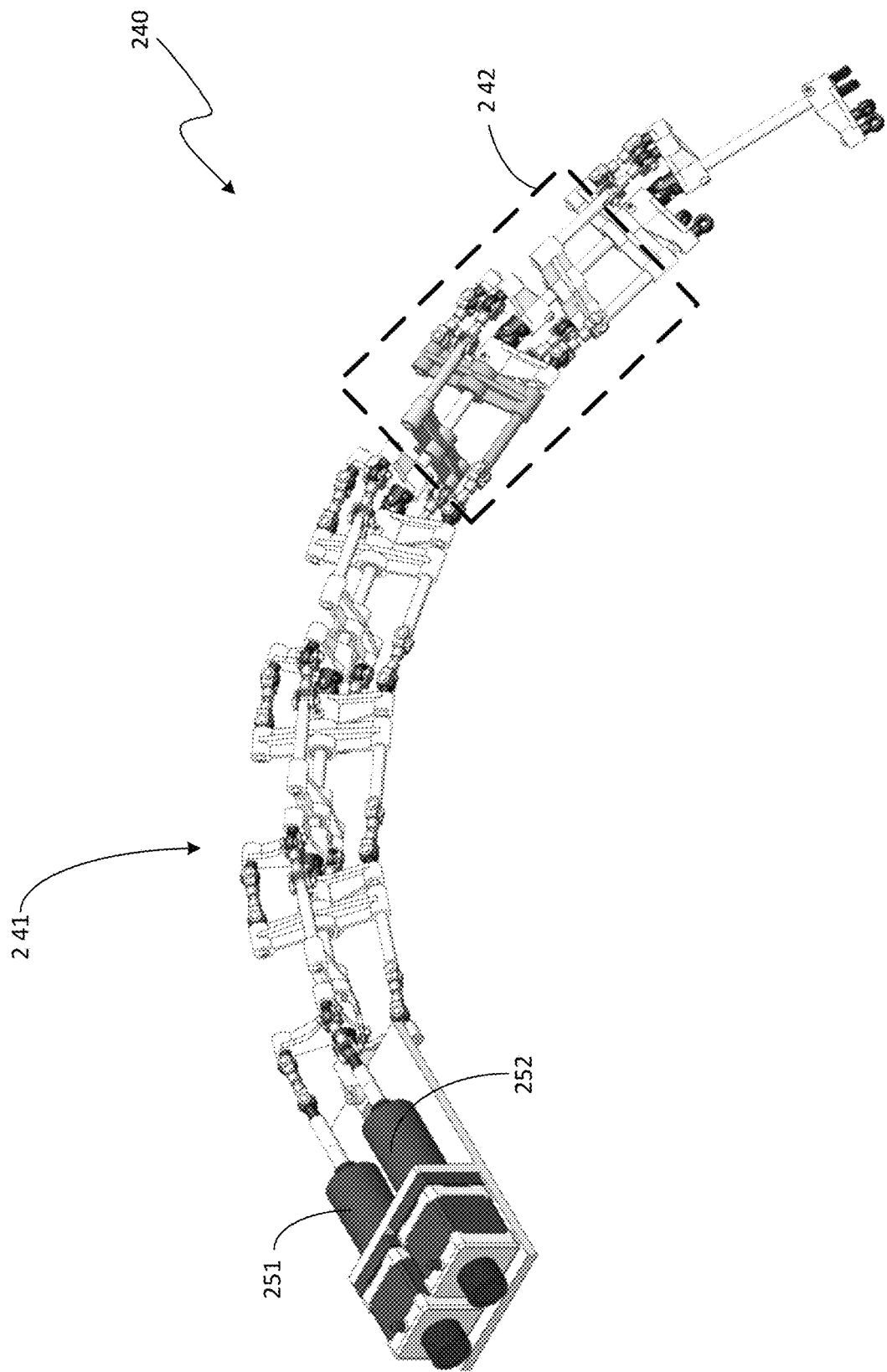
FIG. 22A is a perspective view of a rigid-coupling robotic tail (RCT) system in accordance with a representative embodiment.
Figure 22B:
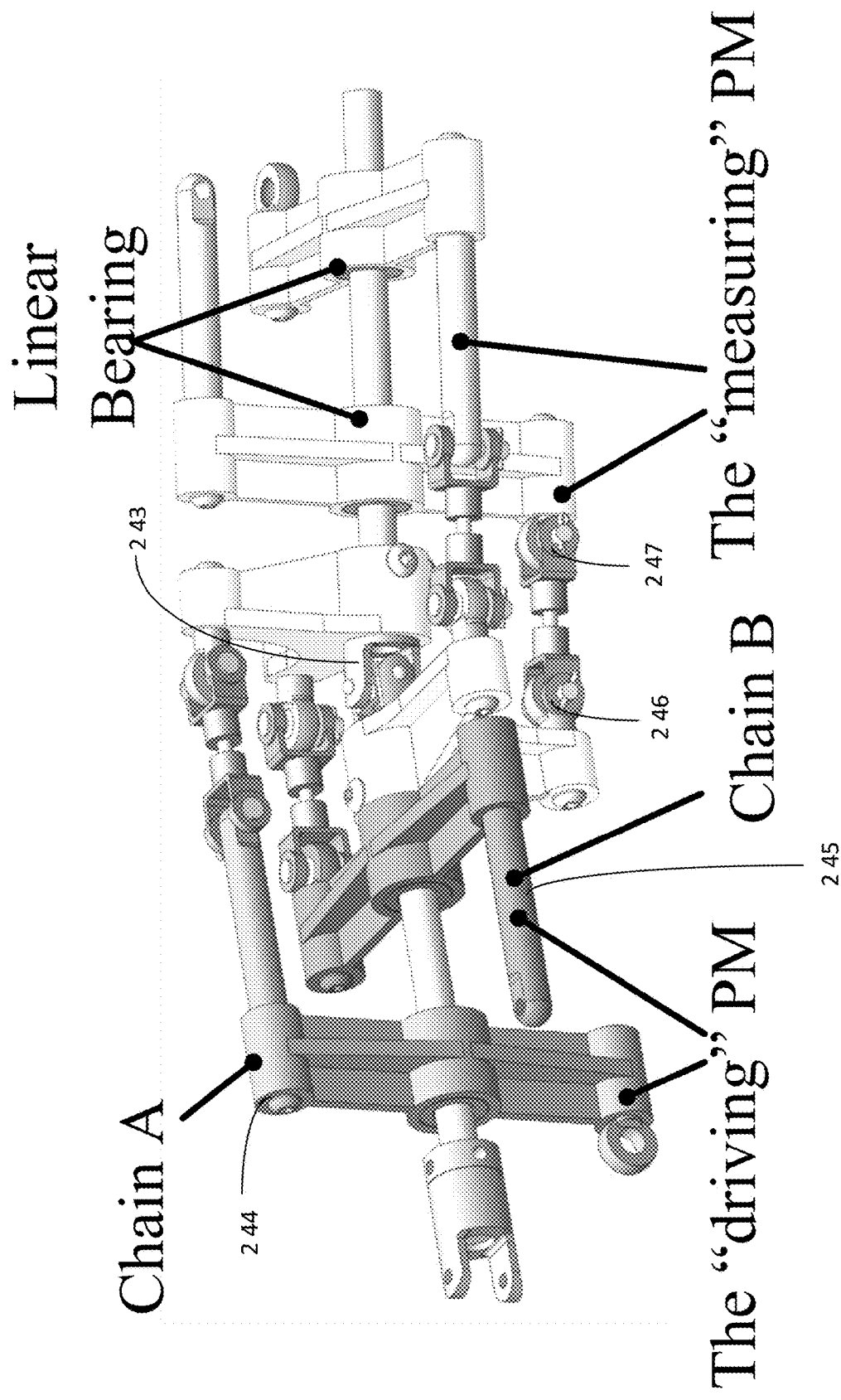
FIG. 22B is a perspective view of the portion of the RTC contained in the dashed box 242 shown in FIG. 22A.

FIG. 22A is a perspective view of the rigid-coupling tail (RCT) system 240 in accordance with a representative embodiment. The RCT system 240 comprises an RTC 241 comprising n links. FIG. 22B is a perspective view of the portion of the RTC 241 contained in the dashed box 242 shown in FIG. 22A. In this example, n=7 and the links are connected serially by universal joints. The universal joint 243 is driven by two perpendicular PSS chains, which are denoted as chain A 244 and chain B 245. Chain A 244 and chain B 245 along with the universal joint 243 constitute the "driving" PM. To take advantage of the current link motion for driving the next link, an identical, but head-to-head placed, PM (sharing the same universal joint 243) constitutes the rigid coupling mechanism. This symmetric design brings in a unique kinematic advantage in that the input displacements for the n+1$^{th}$ link can be obtained by computing the inverse kinematics of the PM for exchanged negative rotation angles. Chain A 244 and chain B 245 are also designed to be identical so that the yaw and pitch rotations have the same property.

Another important design feature is that the placement of the ball joints 246 and 247 results in chain A 244 acting as a planar mechanism with kinematics that are independent of chain B 245. However, chain B 245 is still a spatial mechanism affected by chain A 244. This feature facilitates the kinematic computation of the PM, and more importantly, allows changing the first ball joint 246 to a revolute joint. By doing so, the slider no longer needs to be constrained by the shaft and thus reduces the manufacturing complexity. It is worth noting that for the "measuring" PM, due to the symmetric design, chain B 245 becomes the planar mechanism while chain A 244 is the affected one.

It should be emphasized that the above-described embodiments are merely possible examples of implementations set forth to provide a clear understanding of the inventive principles and concepts. Many variations and modifications may be made to the above-described embodiments without departing substantially from the scope of the invention. All such modifications and variations are intended to be included herein within the scope of this disclosure and the following claims.

What is claimed is:

1. An articulated multi-link robotic tail (MLRT) system comprising:
   a rigid housing;
   an actuation unit coupled to the rigid housing; and
   a multi-link robotic tail (MLRT) having a proximal end that is coupled to the rigid housing and a distal end opposite the proximal end, the MLRT comprising N segments, where N is a positive integer that is greater than or equal to one, each segment comprising i rigid links, where i is a positive integer that is greater than or equal to two, each segment being actuated independently by one or more actuators of the actuation unit, each link being mechanically coupled to the one or more actuators of the actuation unit and capable of being actuated by the one or more actuators to adjust a pitch, yaw and roll of the MLRT, wherein N actuators of the one or more actuators comprise:
   a segment gear motor mechanically coupled to a pulley having at least one cable channel that holds a respective cable, each cable being routed along the links in a preselected routing configuration such that actuation of the cables in a predetermined manner causes the MLRT to have a predetermined pitch and yaw, wherein at least one of the one or more actuators comprises a roll-degree of freedom (DOF) gear motor mechanically coupled to a spur gear that is mechanically coupled to the rigid housing, wherein actuation of the roll-DOF gear motor in a predetermined manner imparts a predetermined degree of roll to the rigid housing.

2. The articulated MLRT system of claim 1, wherein N is equal to or greater than two.

3. The articulated MLRT system of claim 2, wherein i is equal to or greater than three.

4. The articulated MLRT system of claim 2, wherein the cables are routed along nested cylindrical surfaces of links, and wherein at least one of the cables is routed along the links in an S-shaped routing configuration and at least one of the cables is routed along the links in a parallel routing configuration, and wherein the cable routing configurations decouple actuation of segment N from actuation of segment N-1.

5. The articulated MLRT system of claim 4, wherein the cable routing configurations enable a curvature of segment N to be controlled by the actuation unit without being affected by bending of segment N-1.

6. The articulated MLRT system of claim 2, wherein the actuation unit comprises:
   N encoders mechanically coupled to the N pulleys, respectively, for sensing angular rotation of the pulleys and outputting feedback signals;
   an encoder mechanically coupled to the roll-DOF for sensing angular rotation of the roll-DOF gear motor and outputting feedback signals; and
   a controller that receives the feedback signals and determines, based at least partially on the feedback signals, the pitch, roll and yaw of the MLRT, the controller outputting control signals to the gear motors to control the pitch, yaw and roll of the MLRT.

7. The articulated MLRT system of claim 1, wherein the links are mechanically coupled by springs or gears in a way that adjacent joints have a similar rotation angle.

8. An articulated multi-link robotic tail (MLRT) system comprising:
   a rigid housing;
   an actuation unit coupled to the rigid housing and having a plurality of segment actuators and at least one roll-degree of freedom (DOF) actuator, each segment actuator comprising a segment gear motor mechanically coupled to a pulley having at least one cable channel that holds a respective cable, the roll-DOF actuator comprising a roll-DOF gear motor mechanically coupled to the rigid housing, wherein actuation of the roll-DOF gear motor in a predetermined manner imparts a predetermined degree of roll to the rigid housing; and
   a multi-link robotic tail (MLRT) having a proximal end that is coupled to the rigid housing and a distal end opposite the proximal end, the MLRT comprising N segments that are coupled together such that an end of each segment is coupled to an end of another of the segments, where N is a positive integer that is greater than or equal to one, each segment comprising i links that are coupled together such that an end of each link is coupled to an end of another of the links, where i is a positive integer that is greater than or equal to two, each link being mechanically coupled to one of the segment actuators via at least one of the cables and capable of being actuated by the segment actuator to adjust a pitch and yaw of the MLRT.

9. A method using an articulated multi-link robotic tail (MLRT) system to maneuver and stabilize a mobile robot, the method comprising:
   providing the mobile robot having an articulated MLRT system integrated therein, the MLRT system comprising a rigid housing, an actuation unit coupled to the rigid housing and an MLRT having a proximal end that is coupled to the rigid housing and a distal end opposite the proximal end, the MLRT comprising N segments, where N is a positive integer that is greater than or equal to one, each segment comprising i links, where i is a positive integer that is greater than or equal to two, each segment being mechanically coupled to an actuator of the actuation unit and capable of being actuated by the actuator to adjust a pitch, yaw and roll of the MLRT, wherein the actuator comprises:
   a segment gear motor mechanically coupled to a pulley having at least one cable channel that holds a respective cable, each cable being routed along the links in a preselected routing configuration such that actuation of the cables in a predetermined manner causes the MLRT to have a predetermined pitch and yaw, wherein the actuator comprises a roll-degree of freedom (DOF) gear motor mechanically coupled to a spur gear that is mechanically coupled to the rigid housing, wherein actuation of the roll-DOF gear motor in a predetermined manner imparts a predetermined degree of roll to the rigid housing; and
   as the mobile robot moves, using the actuators to adjust the pitch, yaw and roll of the MLRT in a way that assists in stabilization and maneuvering of the mobile robot.

10. The articulated MLRT method of claim 9, wherein the mobile robot achieves locomotion by a sequence of stabilization and maneuvering tasks.

11. The articulated MLRT method of claim 9, wherein the stabilization of the mobile robot is accomplished by changing a center of mass of the MLRT system.

12. The articulated MLRT system of claim 9, wherein, as the mobile robot moves, using the actuators to adjust the pitch, yaw and roll of the MLRT in a way that the MLRT exerts an external force into the mobile robot.

13. An articulated multi-link robotic tail (MLRT) system comprising:

a rigid housing;

an actuation unit coupled to the rigid housing; and a multi-link robotic tail (MLRT) having a proximal end that is coupled to the rigid housing and a distal end opposite the proximal end, the MLRT comprising N segments, where N is a positive integer that is greater than or equal to one, each segment comprising i links, where i is a positive integer that is greater than or equal to two, each link being mechanically coupled to one or more actuators of the actuation unit and capable of being actuated by the one or more actuators to adjust at least one of a pitch, yaw and roll of the MLRT, wherein N actuators of the one or more actuators comprise:

a segment gear motor mechanically coupled to a pulley having at least one cable channel that holds a respective cable, each cable being routed along the links in a preselected routing configuration such that actuation of the cables causes the MLRT to have a pitch and yaw, wherein at least one of the one or more actuators comprises a roll-degree of freedom (DOF) gear motor mechanically coupled to a spur gear that is mechanically coupled to the rigid housing, wherein actuation of the roll-DOF gear motor imparts a degree of roll to the rigid housing.

14. The articulated MLRT system of claim 13, wherein N is equal to or greater than two.

15. The articulated MLRT system of claim 14, wherein i is equal to or greater than three.

16. The articulated MLRT system of claim 14, wherein the cables are routed along nested cylindrical surfaces of links, and wherein at least one of the cables is routed along the links in an S-shaped routing configuration and at least one of the cables is routed along the links in a parallel routing configuration, and wherein the cable routing configurations decouple actuation of segment N from actuation of segment N-1.

17. The articulated MLRT system of claim 16, wherein the cable routing configurations enable a curvature of segment N to be controlled by the actuation unit without being affected by bending of segment N-1.

18. The articulated MLRT system of claim 14, wherein the actuation unit comprises:

N encoders mechanically coupled to the N pulleys, respectively, for sensing angular rotation of the pulleys and outputting feedback signals;

an encoder mechanically coupled to the roll-DOF for sensing angular rotation of the roll-DOF gear motor and outputting feedback signals; and a controller that receives the feedback signals and determines, based at least partially on the feedback signals, the pitch, roll and yaw of the MLRT, the controller outputting control signals to the gear motors to control the pitch, yaw and roll of the MLRT.

* * * * *